(12) United States Patent
Pierce et al.

(10) Patent No.: US 12,033,516 B1
(45) Date of Patent: Jul. 9, 2024

(54) SYSTEMS AND METHODS FOR REMOTE IDENTIFICATION OF UNMANNED AIRCRAFT SYSTEMS

(71) Applicant: Pierce Aerospace, Incorporated, Fishers, IN (US)

(72) Inventors: Aaron Pierce, Carmel, IN (US); Gary L. Bullock, Bedford, IN (US); Larry Carl Howard, Bloomington, IN (US); Michael Collins, Danville, IN (US)

(73) Assignee: PIERCE AEROSPACE INCORPORATED, Fishers, IN (US)

( * ) Notice: Subject to any disclaimer, the term of this patent is extended or adjusted under 35 U.S.C. 154(b) by 322 days.

(21) Appl. No.: 17/239,499

(22) Filed: Apr. 23, 2021

Related U.S. Application Data

(63) Continuation-in-part of application No. 17/278,651, filed as application No. PCT/US2018/052328 on Sep. 22, 2018.

(60) Provisional application No. 63/014,527, filed on Apr. 23, 2020.

(51) Int. Cl.
  *G08G 5/00* (2006.01)
  *B64C 39/02* (2023.01)

(52) U.S. Cl.
  CPC ......... *G08G 5/0013* (2013.01); *B64C 39/024* (2013.01); *G08G 5/0082* (2013.01); *B64U 2201/10* (2023.01)

(58) Field of Classification Search
  CPC .. G08G 5/0013; G08G 5/0082; B64C 39/024; B64U 2201/10
  See application file for complete search history.

(56) References Cited

U.S. PATENT DOCUMENTS

| | | |
|---|---|---|
| 5,528,234 A | 6/1996 | Mani et al. |
| 5,570,095 A | 10/1996 | Drouilhet, Jr. et al. |
| 6,681,158 B2 | 1/2004 | Griffith et al. |
| 8,886,459 B2 | 11/2014 | Stefani et al. |
| 8,977,481 B1 | 3/2015 | Downs |
| 9,087,451 B1 | 7/2015 | Jarrell |
| 9,412,278 B1 | 8/2016 | Gong et al. |

(Continued)

FOREIGN PATENT DOCUMENTS

| | | |
|---|---|---|
| EP | 3236403 | 10/2017 |
| WO | 2019032162 | 2/2019 |

OTHER PUBLICATIONS

AirMap critical enablers: Five Critical Enablers or Safe, Efficient, and Viable UAS Traffic Management (UTM); Technical report; AirMap, Jul. 24, 2018.

(Continued)

*Primary Examiner* — Ayoub Alata
(74) *Attorney, Agent, or Firm* — Innovation Law Office; Dennis S. Schell

(57) ABSTRACT

Embodiments of the present disclosure describe a secure, scalable and extensible unmanned aircraft system identity management (IdM) system that enables services for identity provisioning (idP), and identity validation, verification and authentication (idVV&A). The system uses dual-mode local broadcast and network connected UAS communication elements across a wide area network. The system serves as a Source System of Record (SSoR) that securely ingests private registration data, UAS identity verification and authentication requests and returns validated identity and flight information.

20 Claims, 10 Drawing Sheets

(56) References Cited

U.S. PATENT DOCUMENTS

| | | | |
|---|---|---|---|
| 9,646,502 B1 | 5/2017 | Gentry | |
| 9,658,619 B1* | 5/2017 | Bethke | B64C 39/024 |
| 9,805,273 B1 | 10/2017 | Seeber et al. | |
| 10,365,646 B1 | 7/2019 | Farnsworth et al. | |
| 10,420,062 B2 | 9/2019 | Kim et al. | |
| 10,733,894 B1 | 8/2020 | Beard et al. | |
| 2007/0236366 A1 | 10/2007 | Gur et al. | |
| 2010/0066604 A1 | 3/2010 | Limbaugh et al. | |
| 2011/0246002 A1* | 10/2011 | Shavit | G08G 5/0043 |
| | | | 701/14 |
| 2011/0299732 A1 | 12/2011 | Jonchery et al. | |
| 2012/0182161 A1 | 7/2012 | Rutherford et al. | |
| 2013/0217332 A1 | 8/2013 | Altman et al. | |
| 2014/0156114 A1 | 6/2014 | Aymeric et al. | |
| 2014/0342760 A1 | 11/2014 | Moldavsky et al. | |
| 2015/0106900 A1 | 4/2015 | Pinski et al. | |
| 2015/0260824 A1 | 9/2015 | Malveaux | |
| 2016/0078759 A1 | 3/2016 | Merayoff et al. | |
| 2016/0140851 A1 | 5/2016 | Levy et al. | |
| 2016/0247404 A1 | 8/2016 | Srivastava et al. | |
| 2017/0039424 A1 | 2/2017 | Nerayoff et al. | |
| 2017/0160740 A1 | 6/2017 | Srivastava et al. | |
| 2017/0160751 A1 | 6/2017 | Pierce et al. | |
| 2017/0248969 A1 | 8/2017 | Ham et al. | |
| 2017/0255802 A1 | 9/2017 | Falk et al. | |
| 2017/0261604 A1 | 9/2017 | Van Voorst | |
| 2018/0086451 A1 | 3/2018 | Vaughn et al. | |
| 2018/0090012 A1 | 3/2018 | Jo et al. | |
| 2018/0091908 A1 | 3/2018 | Goel et al. | |
| 2018/0107209 A1 | 4/2018 | Hardee et al. | |
| 2018/0107213 A1* | 4/2018 | Kuhara | H04N 7/185 |
| 2018/0111683 A1 | 4/2018 | Di Benedetto et al. | |
| 2018/0114450 A1 | 4/2018 | Glaab et al. | |
| 2018/0128895 A1 | 5/2018 | Seeber et al. | |
| 2018/0129881 A1 | 5/2018 | Seeber et al. | |
| 2018/0141656 A1 | 5/2018 | Heinonen et al. | |
| 2018/0144644 A1 | 5/2018 | Heinonen et al. | |
| 2018/0157255 A1 | 6/2018 | Halverson et al. | |
| 2018/0165968 A1 | 6/2018 | Clark et al. | |
| 2018/0165972 A1 | 6/2018 | Zelenka | |
| 2018/0194455 A1 | 7/2018 | Park et al. | |
| 2018/0211263 A1 | 7/2018 | Gong et al. | |
| 2018/0222600 A9 | 8/2018 | Matos | |
| 2018/0253092 A1 | 9/2018 | Trapero Esteban et al. | |
| 2018/0262501 A1 | 9/2018 | Sugahara | |
| 2018/0275654 A1 | 9/2018 | Merz et al. | |
| 2018/0293898 A1 | 10/2018 | Redmann et al. | |
| 2018/0305012 A1 | 10/2018 | Ichihara | |
| 2018/0357909 A1 | 12/2018 | Eyhorn | |
| 2018/0364741 A1 | 12/2018 | Van Voorst | |
| 2018/0373243 A1 | 12/2018 | Russell | |
| 2019/0012922 A1 | 1/2019 | Selander et al. | |
| 2019/0019418 A1 | 1/2019 | Tantardini et al. | |
| 2019/0031346 A1 | 1/2019 | Yong et al. | |
| 2019/0051190 A1 | 2/2019 | Russell et al. | |
| 2019/0075543 A1 | 3/2019 | Kim et al. | |
| 2019/0103030 A1* | 4/2019 | Banga | G08G 5/0082 |
| 2019/0139421 A1 | 5/2019 | Nilsson et al. | |
| 2019/0147747 A1 | 5/2019 | Arngren et al. | |
| 2019/0295426 A1 | 9/2019 | Nisson et al. | |
| 2020/0008059 A1* | 1/2020 | Fox | H04W 12/06 |
| 2020/0158814 A9 | 5/2020 | Troxler | |
| 2020/0310408 A1* | 10/2020 | Carper | B64C 39/024 |

OTHER PUBLICATIONS

AirAscend Proposes Electronic "License Plate" for Drones article; downloaded from <www.ariascend.com/ariascend-proposes-electronic-license-plate-for-drones/>(downloaded Jan. 12, 2021).

AriAscend Whitepaper: Downloaded from <https://www.dropbox.com/s/p4n6f5bcmkooph3/AriAscend%20Whitepaper.pdf?dl=0>(downloaded Jan. 12, 2021, no longer available).

Kjeld Jensen, Martin Skiver & Ulrik Pagh Schultz; Drone Identification and Tracking in Denmark Technical Report; Retrieved from< https://www.researchgate.netpublication/348751258_Drone_Identification_and_Tracking_in_Denmark_Drone_Identification_and_Tracking_in_Denmark—downloaded Jan. 14, 2021.

UAS ID ARC Final Report: Downloaded from <https://www.faa.gov/regulations_policies/rulemaking/committees/documents/media/UAS%20ID%20ARC%20Final%20Report%20with%20Appendices.pdf >(downloaded Apr. 16, 2021).

Airmap—The Digital and Fully Automated Control Center for Drones; Downloaded from <https://www.airmap.com/utm-dashboard/ on Sep. 10, 2018.

PCT Written Opinion dated Jan. 18, 2019 for PCT/US 2018/52328 by the Inlemational Searching Authority.

European Search Report dated Apr. 7, 2022 for App. No. 18933900.5.

* cited by examiner

SYSTEMS AND METHODS FOR REMOTE IDENTIFICATION OF UNMANNED AIRCRAFT SYSTEMS

CROSS-REFERENCE TO RELATED APPLICATION

This is a continuation-in-part application of pending U.S. patent application Ser. No. 17/278,651, filed Mar. 22, 2021, and titled Systems and Methods of Identifying and Managing Remotely Piloted and Piloted Air Traffic, which is a US National Stage Application of PCT/US2018/052328, filed Sep. 22, 2018, and titled Systems and Methods of Identifying and Managing Remotely Piloted and Piloted Air Traffic; and this application also claims priority to U.S. Provisional Patent Application No. 63/014,527, filed Apr. 23, 2020, and titled Systems and Methods for Remote Identification of Unmanned Aircraft Systems, all of which are incorporated herein by reference.

TECHNICAL FIELD

Embodiments of this disclosure relate generally to identifying air traffic, and more particularly to systems and methods for identifying manned and unmanned aircraft systems using mediated access policies.

BACKGROUND AND SUMMARY

Remote Identification (RID) Service Utility System

This disclosure provides an overview of a Flight Portal ID (FPID) system and methods for validating the identity of UAS and UAS owners and pilots at registration, verifying these identities during flight, and checking the details of the flight plan and whether the UAS is conforming to it. This disclosure describes offering at least these methods as a public digital service system function as or like a utility, e.g., but not limited to, regulated by the FAA but provided by a commercial service. This disclosure includes Session IDs, issued by the system as a Single Source of Truth (SSOT) for identity, tied to flight plan, flight plan approval status and flight data that can be accessed with an appropriate level of authorization. The disclosure also includes the foundation that RID is a broadcast capability, with constant network connectivity being a desirable addition for certain use cases, but not a universal requirement. Consequently, RID UAS types are adjusted and expanded with a combination of broadcast and various performance levels of networked UAS included. A notional, dynamic performance-based airspace classification system is also described that matches the RID performance requirements of UAS to the type of airspace in which they fly. Finally, data from broadcast UAS is added to the Net-RID Service Provider network via networked receivers.

RID Service System Background and Summary

Safety and security considerations demand that Unmanned Aerial Systems (UAS) be remotely identifiable. Civil Aviation Authorities (CAAs) worldwide, including the Federal Aviation Administration (FAA) in the United States, are proposing and promulgating rules and regulations for UAS remote identification (RID). And ASTM International, Technical Committee F38 (UAS), Subcommittee F38.02 (Aircraft Operations) has developed and proposed a standard for UAS Remote ID and Tracking (work item WK65041, hereafter referred to as "the standard," hereby incorporated herein by reference).

The standard proposes two methods for UAS RID. Network RID defines methods that enable RID and flight information to be made available via a wide area network, for example, the internet. Broadcast RID defines a message structure and format for Unmanned Aircraft Systems (UAS) to transmit locally one-way via a local area network or radio connection, for example, Bluetooth or Wi-Fi. Network RID requires Internet connectivity across several segments from the UAS to an observer using a display application. Broadcast RID, in the standard, is directly observable in an application connected to a receiver and could be verified with an Internet connection.

Significantly, RID exists for the purpose of cross-referencing the ID with valid identifying information about the UAS and associated owners and operators. Some minimal information is desirable for public access, such as a "license plate" for reporting dangerous or unlawful activity and optional information about the purpose or intent of a UAS. Other information, such as UAS owner/operator Personally Identifiable Information (PII) must be limited to authorized personnel by policy. The standard specifies only how the RID "license plate" is to be made available to interested parties, not how it can be cross-referenced to valid UAS/owner/operator information registered with a CAA or a digital system that is officially charged with Identification Management (IdM). The trustworthiness of UAS RID information is of critical importance. Additionally, authorities charged with public safety need the means to cross reference a session ID with the appropriate PII, flight plan, flight plan approval status and any necessary current or historical flight data.

Size, Weight and Power (SWaP) constraints for UAS severely limit the types and capabilities of onboard RID devices. Cost is also an impediment to the necessary near-universal adoption of additional UAS hardware for RID. However, advances in beacon broadcast technology are expected to continue in the Internet of Things (IoT) arena and have already shown promise in various military tests and demonstrations (e.g., see Example A for details). For reasons discussed in this disclosure, local broadcast capability is a foundational requirement for RID.

For the UAS Ecosystem to thrive the three pillars of Remote ID, Unmanned Traffic Management, and Counter-UAS, must work harmoniously. Both UTM and C-UAS are supported by the Remote ID pillar. To be most effective, a system and methods according to this disclosure provide Remote ID services through a digital system, offering a single source of truth and single source of record for both the UTM and C-UAS technology pillars. The objective of providing industry with RID services from the system operating as or like a utility is for a cost-effective method to verify identity across commercial UTMs that supports safe airspace management and growth of airspace use. This system can simultaneously provide government authorities a uniform tool for use across the C-UAS suite of technologies that must be put in place for supporting the safety and security of the sky. RID as a utility to support both is vital to support both commercial and security operations with a common operating picture (COP), especially with the variance in C-UAS and UTM technologies and business objectives.

Further Background and Summary

The rapidly evolving unmanned aircraft industry offers exponential benefits to humanity and unlimited possibilities through the imagination of various unmanned aircraft system stakeholders and operators around the globe. Unmanned aircraft have already disrupted some industries beyond aerospace and their impact will continue to expand as technology continues to progress beyond what's available on the market today. The unmanned aircraft industry's ability to make positive impacts is unquestionable, but today's regulatory barriers hinder its impact and create a landscape that restricts both competition and collaboration across the global market. If allowed, tomorrow's skies will be full of unmanned aircraft users who will advance civilizations and enhance the performance of economies well beyond aerospace. However, the aerospace industry, particularly the regulators within the aerospace industry, must first adopt a global identification, communication, and airspace protocol which eases barriers and enables today's visionaries to create these new and transformative technologies.

In today's aerospace environment, there is not an accurate and efficient method for managing and identifying aircraft, including manned/piloted and unmanned/remotely-piloted/autonomous aircraft, present within in a particular airspace. The lack of managing and identifying means presents unique issues, for example, with air traffic control coordination, privacy concerns, security concerns, business concerns, insurance and liability ambiguity, and others. There can be significant safety and privacy concerns when an observer of an aircraft is unable to verify certain aspects of the aircraft, for example the "who," "what," "where," "how," and "why" questions regarding the operators and operating purposes behind Unmanned Aircraft Systems (UAS) (e.g., drones). While manned aircraft have a fairly high barrier to access and operate them, unmanned aircraft are relatively inexpensively and easily obtained and operated, thus having little to now barrier to access and operate by anyone, providing widespread use and risk of abuse that is arguably more likely to lead to problems that must be addressed by local law enforcement than for manned aircraft.

For example, present technical solutions do not provide local law enforcement with access to information about pilots operating an aircraft. Law enforcement does not possess or have access to the specialized equipment and communications networks used by agencies such as ATC and NORAD which may or may not contain the information sought. Therefore, for manned aircraft, law enforcement must manually request any information from the FAA that may be on file with a flight plan or must intercept the aircraft upon landing to discover the identity of the aircraft. For unmanned aircraft, law enforcement must physically search for and locate the operator of the remote controller used to pilot the aircraft.

These safety and privacy issues also prevent or largely limit the execution of a various aircraft operation types, including automated flights and flights beyond visual line-of-sight. Further, military operations have these same concerns when the military is unable to classify an aircraft as "friendly" or "non-friendly." While the problems and solutions described herein may be most often directed toward UAS, it should be understood that many of the same problems and solutions are also relevant to manned aircraft.

The continued progression of UAS into everyday life, along with the expansion of the capabilities of UAS, has increased the threat of UAS use for nefarious, criminal, or terroristic intents. This has been widely realized in battlefields where UAS, including commercial off-the-shelf (COTS) UAS, have been utilized for targeting or ordinance delivery against both military soldiers and civilians alike. Safety threats can arise from any one of home-built, commercial, or military-specific UAS.

There is no current technical solution providing broad communication of identity information into the evolving Unmanned Traffic Management (UTM) ecosystem. Currently aircraft most commonly use transponders, such as civilian ADS-B and military based IFF transponders, which transmit information in a visual line-of sight manner. These transponder systems are limited in scope and are not effective in scaling to large numbers of aircraft in dense airspaces, and they can also oversaturate users with information if the systems were to be scaled to be used for UAS. Military-based IFF transponders are visual line-of-sight only and, as such, limited in transmitting information in urban, built, or varying terrain environments. Both ADS-B and IFF transponders require the addition of a physical transponder or emitting device to the aircraft, adding cost, power requirements, and weight that becomes impractical, particularly as the aircraft are scaled below a particular size. As a result, the vast majority of unmanned aircraft in use have no equipment that provides detection by or coordination with present ATC systems.

Present systems also do not account for identification or other information beyond what they are programed to communicate: typically an aircraft registration number, a squawk code assigned at the time of communication with ATC, position (including altitude), and the velocity vector. Additionally, use of existing transponder technology such as ADS-B require several hundred specialized radio stations dedicated to the particular implemented standard and use by only ADS-B equipped aircraft. Furthermore, no privacy or security provisions are included in present identity and management systems such as ADS-B. WIFI and bluetooth-based systems are in existence, but these systems focus on direct energy broadcast of information that is effective over only a very limited range and altitude.

Additionally, even if unmanned aircraft could be practically equipped with ADB-S transponder gear and/or ATC compatible radio gear, present dependence of those systems of a man-in-the-loop controllers, to provide flight clearance and traffic deconfliction provide a chokepoint that prevent scaling of present air traffic identity and management systems from being scaled up to satisfy the current and future projected volume of flight activity of unmanned systems. As an example, because prior systems were not designed to accommodate higher density operations, during the world's largest aviation convention held each year in Oshkosh, Wisconsin, all in-bound and out-bound aircraft are instructed to turn off their non-ADS-B transponders within 30 nm of the airfield.

As an example, a typical prior art environment 100 is illustrated in FIG. 1. Piloted aircraft 120a and 120b include transponders 122a and 122b respectively. Position and velocity data is determined by aircraft 120a and 120b and provided to transponders 122a and 122b using timing signals received from Global Navigation Satellite System (GNSS) 102. For one type of prior art transponders 122a and 122b, for example, transponder 122a and/or dedicated station 104 sends an interrogation radio signal received by transponder 122b. In response, if cooperating, transponder 122b sends identification data to transponder 122a and/or dedicated station 104. For another type of prior art transponder 122a periodically broadcasts identification, position, and velocity data which is received directly by transponder 122b and dedicated station 104, and may also be received by transponder 122b by rebroadcasting from dedicated station 104. A communications network such as a wide area network 106, for example, the communications networks comprising the internet, can transmit the identification, position, and velocity data from dedicated radio network station 104 to prior art identity and management system 110, for example, a prior art air traffic control system (ATC).

Typical unmanned aircraft systems (UAS) 130, including for example a remotely piloted or autonomous aircraft 132, are not in communication or observed by the prior art air traffic identity and management system 110, including not by dedicated station 104. The only communication link typical with the UAS 130 is between transceiver 134 of aircraft 132 and transceiver 142 of remote controller 140, enabling operator 144 to control the flight of aircraft 132. Therefore not the identity, position, and velocity, nor any other informational data about the UAS 130, including about operator 144 of the UAS, are accessible by aircraft 120*a* and 120*b*, air traffic identity and management system 110, dedicated station 104, or any other users, agencies, or devices, whether or not connected with WAN 106.

Embodiments of the present disclosure provide improved systems and methods for identification of unmanned aircraft systems. The systems and methods of the present disclosure provide communications protocols in a safe and sensible manner that both protects and shares sensitive information, such as identity, at the same time.

The exemplary system for identifying and managing air traffic is a dynamic secure identification network system enabling users of the system, including aircraft and aircraft operators, to engage with all users of the system and share identification information through a permission-based network system, for example, a blockchain based system. The system enables varying levels of identification information to be communicated about each aircraft system located within the ecosystem being queried by a user. Aircraft systems may include operated and/or autonomous aircraft systems.

Adding to the complexity already present within the aerospace industry, regulated airspace is becoming more often accessed due to the growing population of UAS. A UAS in a particular airspace may need to interact with geofence-based technologies for flight planning and flight activity, and more particularly, may need to receive authorization from a regulatory entity before entering into some regulated airspaces. An air traffic identity and management system, such as is described in the disclosed embodiments, provides an aircraft operator with the information needed to gain access into airspace, in effect using the network identification information as a key to the airspace. Electronic geofences in the cyber domain may oftentimes be fluid and dynamic, resulting in a need for an aircraft identity network which can respond to rapidly-changing policy, including geofence rules and identity parameters in real-time, ensuring low transaction costs and scaling to higher volumes that than experienced with manned aircraft alone.

The identity and management system can be composed of many changing components that can be directly or indirectly engaged with the identification network. Airspace environments are evolving to include components that represent an Unmanned Traffic Management (UTM) ecosystem. A UTM ecosystem consists of many stakeholders, including system users, and technologies such as radars, radios, detection sensors, visual sensors, geofence software applications, databases, blockchain, Bluetooth devices, UAS, augmented or artificial reality (AR) systems, line-of-sight communications, command and control (C2) software, mobile devices, and more. As disclosed herein, the identity and management system is deployed as the underlying method for syncing the disparate information that constitutes a user, operator, or aircraft's identification. More specifically, the identity and management system is adaptable in nature allowing it the capability to incorporate legacy aircraft communications systems such as ADS-B and IFF transponders, but the identity and management system is unique in that it can collect disparate and disjointed information, sync the information together, and then make it widely available through a permissioned-based blockchain network system, particularly over a wide area network, for example, the communications networks comprising the internet.

One advantage of the identity and management system is that it is agnostic to technology and policy changes. WiFi, Bluetooth, other physical transponders, the user's physical devices and aircraft, will all evolve over time. The identity and management system can interact with legacy systems and is capable of evolving to respond to constant iteration and software update for improvement in efficiency, therefore allowing it to serve a UTM ecosystem through technology and policy evolutions that may require different types of user identity to be collected and transmitted and different user rules within the UTM ecosystem.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

Figure 1:
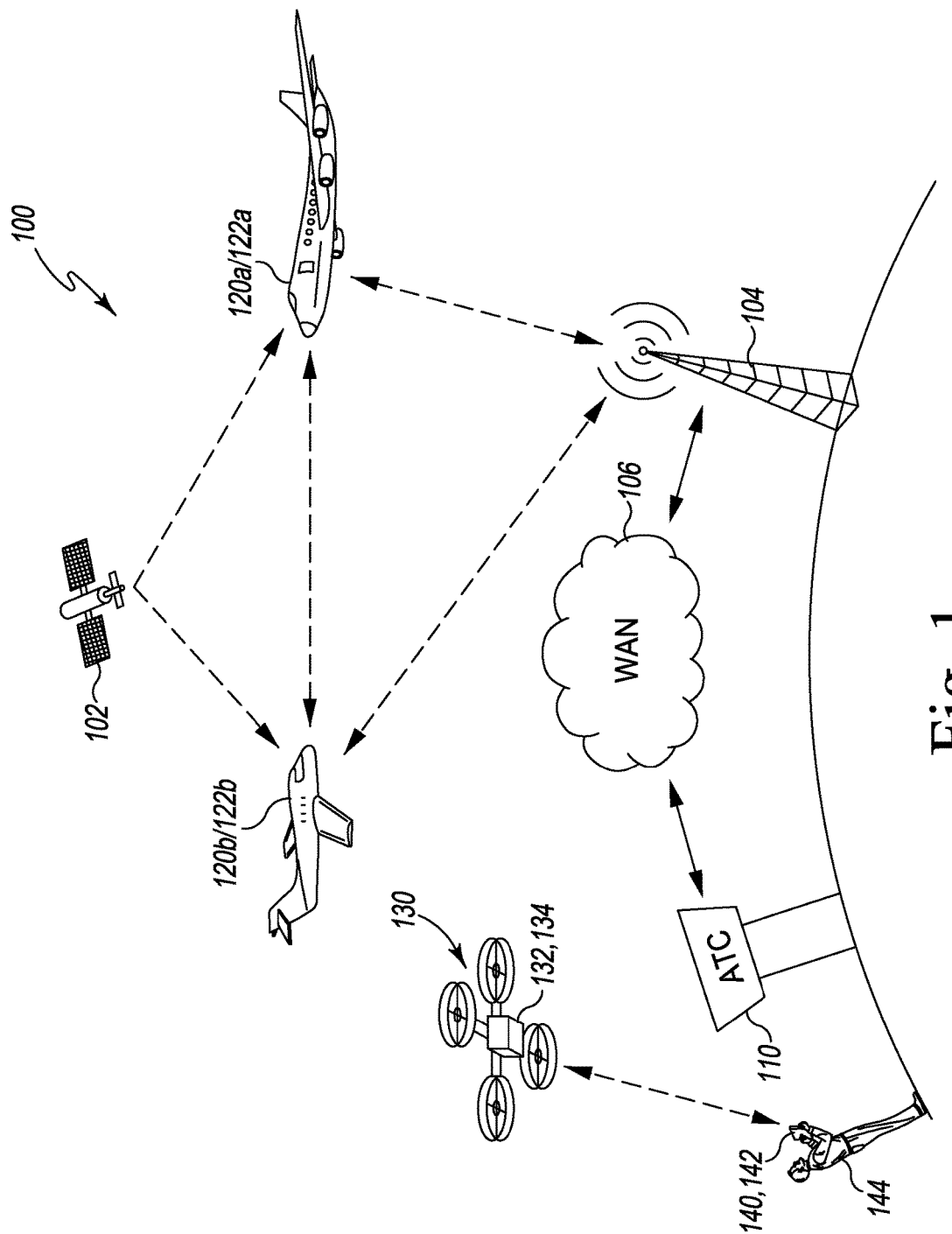
FIG. 1 is a prior art system for identifying and managing air traffic.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Flight Portal ID (FPID) Overview

This disclosure describes Flight Portal ID (FPID) system and provides examples of its structure and use. The FPID system is a secure, scalable and extensible identity management (IdM) system that enables services for identity provisioning (idP), and identity validation, verification and authentication (idVV&A). These services are deployable across the entire spectrum of UAS applications. The system serves as a Source System of Record (SSoR) that securely ingests private registration data, UAS identity verification and authentication requests and returns validated identity and flight information. The FPID system enables a standards-compliant utility service that functions with the ASTM F38 Remote ID Standard.

Figure 10:
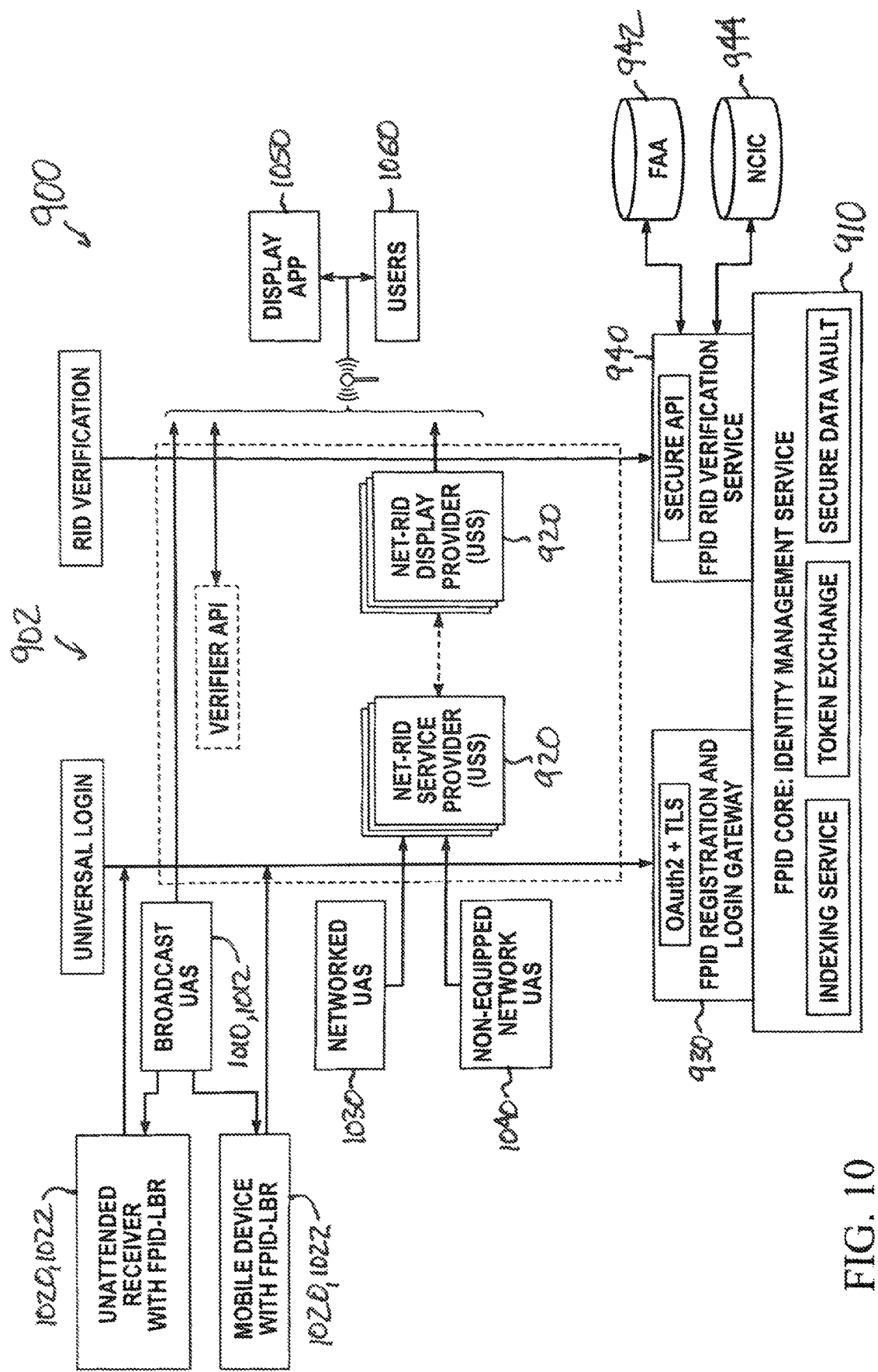
FIG. 10 is a block diagram illustrating how the FPID components interact with the USS ecosystem, the public and authorities according to the present disclosure.

In one embodiment illustrated in FIG. 10, the FPID system 900 includes the following components:

Flight Portal ID Core for Identity Management (FPID-CORE):

The FPID-CORE system 910 is the foundational system for performing IdM. It includes indexing, token exchange and secure data vault services in support of its IdM functions. It performs all aggregation and correlation functions within the IdM and Verification system. This system may include software operating on a cloud or remote service and also provides a unique per-flight session ID and validates UAS operator identity with both government and third-party sources of identity. The FPID-CORE system 910 communicates to USSs 920 via a nationally scaled and load balanced, secure API gateway 924 and delivers RID lookup information to the public and authorities based on stakeholder authorization level, context and policy.

Flight Portal ID Registration, Authentication and Authorization Gateway (FPID Universal Login Subsystem):

The FPID Universal Login subsystem 930 is a scalable subsystem of the FPID-CORE system 910 that handles secure user registration, identity validation, authentication and authorization. This subsystem service is standards compliant and is used for registering UAS equipment, UAS ownership, UAS operators and operator licenses. It enables true identity validation (to real persons, equipment and licenses) and provides universal login (authentication) and authorization using OAuth and TLS standards. The FPID Universal Login subsystem 930 is the secure OAuth provider for an owner/operator logging into a Net-RID Service Provider USS 920 and handles all authentication for UAS connecting to the RID USS ecosystem. The services within the FPID Universal Login subsystem 930 are accessed via a secure API gateway 924.

Flight Portal ID RID Verification Gateway (FPID RID Verification):

FPID RID Verification subsystem 940 is a scalable subsystem of FPID-CORE 910 that handles RID Verification ("running a license plate"). The RID Verification subsystem feature enables the public, agencies and authorities with appropriate privilege levels to access (as applicable to privilege level). PII matched to associated flight information in the UTM system, including flight plan, flight plan authorization status and historical and real time flight data. The subsystem services within FPID RID Verification are accessed via a secure API gateway 924 (standard compliant for broadcast messages and outside the scope of the standard for net messages).

Flight Portal ID Local Broadcast (FPID-LB):

The FPID-LB 1012 is the firmware that controls FPID beacon broadcast hardware 1010. The FPID-LB can also be incorporated into specification-compliant OEM UAS hardware via a Software Development Kit (SDK). Standard-compliant FPID-LB broadcast messages can be read and verified on handheld and mobile devices and/or forwarded by those devices and unattended receivers using FPID-LBR 1022 to the RID network 902, e.g. operating over a wide-area network such as the internet, just like any other Net-RID message.

Flight Portal ID Local Broadcast Receiver (FPID-LBR):

The FPID-LBR 1022 is the software and/or software and hardware subsystem 1020 that receives RID beacon 1010 broadcasts and forwards them for verification. This subsystem is also capable of reformatting, authenticating, encrypting and relaying messages to Net-RID Service Provider USS 920 for inclusion in data exchange data streams just as any network RID message would be. An SDK is provided for fast integration with display applications such as those installed on hand-held and mobile devices.

Flight Portal ID Beacon and Receiver Hardware:

FPID beacons 1010 and receivers 1020 are an optional hardware component of FPID. A beacon 1010 is a low cost, low power, OEM-installable, on-aircraft RF transmitter module capable of ASTM compliant UAS RID broadcasts. A receiver 1020 may be any type of mobile or hand-held device or a headless (unattended) RF receiver connected to a network (at least intermittently). In either case, these hardware components host FPID-LB/R software 1012 and 1022. The beacons 1010 use hardware-derived encryption with FPID Universal Login to authenticate broadcast messages. The receivers 1020 are independent and can be utilized in conjunction with other airspace monitoring systems or C-UAS systems 1060 for confirming both network and broadcast RID communications, or stand alone for broadcast RID communications. Additionally, the FPID beacons 1010 are designed to function in an emergency mode, including continuation of broadcast signals in the event of power interruption from the UAS power supply.

RID IdM and Verification Offered as a Public Digital Service Utility

Identity Provision (idP) and Identity Verification, Validation and Authentication (IdVV&A) is only minimally covered in existing standards (slightly for broadcast and less for network) and other documents, is assumed to be a function within the FAA. The standard provides for some optional data elements for describing the flight plan but does not provide for a mechanism to indicate an approved plan during a verification process.

The FPID system 900 offers RID IdM function as a public digital service utility that can be used by the USS/UTM ecosystem, government, and directly by the public. The system and service addresses security, authorization, privacy, and nationwide scalability while offering the USS/UTM ecosystem a secure and authoritative, single source of truth (SSOT) for key RID services. The benefits of this approach are the following:

The approach supports the policy of making an RID "license plate" a publicly available resource.

Authorities that maintain security with C-UAS and air defense tools need access to RID verification information that is beyond the scope of commercial UTM services.

An authoritative SSOT outside the scope of the UTM/USS ecosystem is needed for initial and ongoing identity validation of all stakeholders. Identity validation first occurs during registration and provides authentication credentials only to those people and entities that can show proof that they are who they say they are.

RID authentication and verification should not be a cost burden to any stakeholder. Integration across the ecosystem via a utility enables cost to be lowered for all users while supporting private sector UTMs to focus on innovation in traffic management and related services.

RID IdM functions must not be compromised if a USS struggles, goes out of business, or is exposed to a vulnerability or compromise.

RID needs to move across borders. Not all USS's may be eligible to move across borders. One RID IdM system enables easier logistics when integrating with multiple governments and commercial services; enabling a more efficient communication of information while also lowering the burden of policy updates or alterations.

USS will struggle to provide certain RID IdM functions to defense and security operators in a compromised, contested, or combative environment.

A trusted third-party can better protect user PII. Such a regulated utility provides and facilitates privacy to users on a stakeholder permission basis. This approach allows legal and regulatory separation between the regulating body, e.g. the FAA, and the public data holdings it regulates (thus helping to avoid the "fox is guarding the henhouse" apprehension that might otherwise occur).

RID as a utility service allows USSs to focus on their core traffic management and business competencies and CAAs to focus on their core competency of regulation. Furthermore, there are distinct benefits of this utility model to agencies with C-UAS responsibilities.

The Digital Service FPID System 900 can Issue a Session ID to Track Flight Plan, Flight Plan Approval Status and Flight Data Session IDs are a means of protecting identifying information and obscuring patterns of UAS use. The FPID system 900 can provide a per-flight session ID as a public digital service utility for use in signifying and cross-referencing flight plan approval status, and as necessary, flight plan data and historical and near-real-time flight information.

Provenance of the session ID within the public IdM utility ensures that the UAS, UAS owners and UAS operators that are associated with a particular flight plan approval are who they say they are.

Additionally, members (aircraft) of the UAS community who are flying in RID-exempt air space may obtain session IDs directly from the utility in order to obscure flight pattern observation and to protect privacy if they so wish.

Dual Mode Strategy with Broadcast as the Foundation

Local broadcast RID can provide a base level of functionality analogous to a license plate on a car. The beacon 1010 provides this feature by allowing anyone having (with or without a network connection) a publicly available app and mobile device 1020 and 1022 to read the "license plates" on nearby UAS.

Second, cellular coverage across the entire scope of U.S. geography currently isn't (and may never be) 100% complete and reliable. Building the foundation on broadcast RID, capable of transmitting RID messages at 15 ms intervals, provides both a primary and fall-back option for areas of non-coverage, intermittent network connections or complete network outages.

Third, local broadcast provides an easily adoptable option for members of the general public and small businesses who currently do not use an always-on internet connection for UAS flight and may be concerned about cost, privacy and governmental overreach issues if required to provide an always-on connection.

Fourth, local broadcast using beacon technology is capable of providing exactly the same level of RID service as network options (including the assembly of local, regional and national common operating pictures) via networks of receivers (handheld or headless).

Fifth, local broadcast puts the onus for providing identification on the UAS operator and the onus for validating identification on the receiver (which could have both LB+network capabilities). While this may seem like a minor point, the legal and policy implications of blurring this line of responsibility and authority could have significant unforeseen consequences, particularly when varying state and municipal laws are invoked in conjunction with federal mandates and rules surrounding Remote ID. From a technological standpoint, basing RID on local-broadcast may invoke greater flexibility for the technology to meet the intents of policy, even as policy evolves.

Sixth, local broadcast can be augmented by internet-enabled features for commercial entities and advanced applications including autonomous and BVLOS operations.

Seventh, local broadcast has security advantages, including some C-UAS advantages and resilience in the event of cyber-attacks or network outages. As logistics and society become increasingly reliant on UAS operations, this resilience is key to continuation of services.

Finally, local broadcast can perform as an essential basis for detect and avoid (DAA) features, especially at standoff distances.

The network 902 supports a dual-mode FPID system 900 that includes network connection, but local broadcast as a foundation for the above listed reasons. Especially in regard to resilience and redundancy, and especially for the continuation of services, it is envisioned that the majority of commercial operations will include dual-mode equipage, as further outlined below.

Adjust and Expand RID UAS Types

The FPID system 900 can provide six types of RID to the UAS market (Table 1). Present public documents identify just three classifications, but by making broadcast RID a foundational requirement, the classification types can be expanded to cover a broader range of RID capabilities that more realistically align with user requirements and higher probability of compliance. See Example B for examples of use cases in which these RID types are used.

TABLE 1

RID Type Classification

| Remote ID Type | Description | Operating Restrictions |
|---|---|---|
| Non-Equipped (no beacon, no network connectivity) | Manufactured before Remote ID, limited performance capabilities if manufactured after Remote ID, or amateur-built model aircraft without Remote ID. | Limited to FAA Recognized Identification Areas (FRIA), user requested temporary FRIA via a volume based UTM, or specially authorized by Administrator. RID assigned to the volume of airspace via FPID SDK-USS integration and RID information available (based on stakeholder status) when airspace volume is queried. |
| GCS Network (no local broadcast, network/internet present at the Ground Control Station only. Assumes GPS lat/lon of UAS is transmitted to the GCS via the control link) | Manufactured before Remote ID, amateur-built without a Remote ID beacon. Assumes firmware and GCS application updates are required to enable limited RID. | GCS Network ID compliant UAS would transmit a periodic message that INCLUDES location data for the unmanned aircraft AND the Ground Control Station. In this use case, the UAS will have a GPS position that can be relayed to the GCS via the control link and both GCS and UAS location can be transmitted periodically through the network/internet connection. Because there is no beacon capability on the UAS, it is suggested the 400 foot maximum flight distance from the GCS would be enforced in the control hardware to ensure visual line of sight operation. |
| Local Broadcast | RF broadcast (beacon) only. Most commercially available or kit built UAS used for personal or small business applications. | UAS must fly within the geographical and temporal boundaries that UTMs associate with a duly obtained flight session ID. Control station location and operator contact information available to authorized entities. |
| (Commercial/Advanced) Local Broadcast + Network | RF broadcast (beacon) and Network connected. Advanced commercial UAS that can perform BVLOS flight, autonomous operation, on-the-fly rerouting and batch flight authorization. | UAS must fly within the geographical and temporal boundaries that UTMs associate with a duly obtained flight session ID. Control station location and operator contact information available to authorized entities. |

TABLE 1-continued

| | RID Type Classification | |
|---|---|---|
| Remote ID Type | Description | Operating Restrictions |
| Special | Network connected and/or special capability. Including larger UAS equipped with ADS-B and/or private, government or military networking capabilities. | Fly within the constraints of current government and military framework. Identity, flight authorization and intent promulgated on a strictly need-to-know basis. |
| Non-Compliant | No RID detectable. Intent unknown. Operator unknown. | Not allowed. |

Dynamic Performance-Based Airspace Classification Types

The FPID system 900 supports airspace classifications for geographic areas that can also be dynamically overlaid with additional airspace restrictions as required by events. Each dynamically assigned airspace classification type determines the level of RID capability required. The dynamism of the airspace can be managed by UTMs with RID FPID system 900 acting as the "keys" to the airspace, verifying that the operator/aircraft meets the credentials required for that airspace type. The airspace type could alter, such as from "low density" ~ to "medium density" based on data obtained by the UTMs managing the airspaces. Such capability and dynamism introduce significant real team safety enhancements to the airspace by requiring a higher status of RID equipage needed for future airspace management. These dynamic airspaces go beyond RID in terms of aircraft safety equipage. However, the RID of that aircraft can help to confirm the operator/aircraft has that equipage for operating in these airspaces. Table 2 specifies the distinct RID FPID system 900 capabilities while Table 3 lists the dynamic airspace classifications and the associated combinations of RID capabilities for each classification.

TABLE 2

| RID Capabilities Summary | |
|---|---|
| UAS RID Capability | Description |
| Broadcast | UAS equipped with beacon. The "license plate" portion of the message must be readable by anyone with a receiving device. |

TABLE 2-continued

| RID Capabilities Summary | |
|---|---|
| UAS RID Capability | Description |
| | Broadcast messages may be placed on the network by internet-connected receivers (if within range) or used in display apps without forwarding to the internet if no connection exists. |
| Network | UAS is capable of connecting to the internet via a RF Network connection (such as cellular LTE). Dynamic Performance Based Airspace classifications may be assigned based on assessment of the likely continuity of network connections across all segments of the flight path. |
| Session ID broadcast/ transmit | Broadcasting or Transmitting the Session ID instead of the tokenized OEM S/N indicates that a Net-ID Service Provider has authorized the flight plan. Note that under certain exempt and generally approved dynamic performance based airspace designations, a session ID would be a valid means of flight pattern obfuscation but would not correspond to a Net-RID Service Provider flight plan authorization. |

TABLE 3

| Performance Based Airspace Classification | | | |
|---|---|---|---|
| Airspace RID Type Recommendation (Not to be confused with Airspace Classes) | Description | Broadcast/ Network/ Session ID | Possible Regulatory |
| Standard "Charted" FRIA (Such as an AMA Field) | See FAA definition | Broadcast: No Network: No Session ID: No (all optional) | VLOS only, GCS within X distance of UA |
| Non-Standard FRIA Request (Such as pilot's backyard; designed ideally as a subset airspace designation for medium density airspace.) | Same or similar FAA definition, but is a request via UTM for a temporary volume of airspace in Class G, non-restricted airspace. | Broadcast: No Network: Yes - via UTM integration for assigning RID to the volume of airspace. Session ID: Optional - Broadcast also Optional. | VLOS only. GCS within X distance of UAS. |

TABLE 3-continued

Performance Based Airspace Classification

| Airspace RID Type Recommendation (Not to be confused with Airspace Classes) | Description | Broadcast/ Network/ Session ID | Possible Regulatory |
|---|---|---|---|
| Low Density | Low density airspace usage and low density of people/structure/ ground clutter. Example: Rural with flat topography. | Broadcast: Optional for VLOS. Mandatory for BVLOS. Network: Optional | Non-RID Flight allowable if UAS is flown under VLOS rules and remains clear of all other aircraft. Waivers available. |
| Medium Density | Medium density airspace usage. Medium density people/structure/ ground clutter. Likely to be identified in suburban areas. | Broadcast: Mandatory Network: Mandatory. | Beyond Visual Line of Sight flight requires continuous monitoring by UTM. Waivers available. Pre-programmed flight patterns require continuous monitoring by UTM. Can be added as an option to other categories with appropriate clearance. |
| High Density | High density airspace usage. Highly dense people/structure/ ground clutter. City or densely used suburban airspaces. Lots of buildings, complex topology, complex RF environment, and risk associated with urban canyons. Flight plan and flight pre-approved by UTM. Session ID for flight plan approval transferred to UAS for broadcast and optional network transmission. | Broadcast: Mandatory Network: Mandatory | Beyond Visual Line of Sight flight requires continuous monitoring by UTM. Pre-programmed flight patterns require continuous monitoring by UTM. Can be added as an option to other categories with appropriate clearance. |
| Exempt | FAA definitions (+ rural, range & agricultural owned by UAS owner/operator or associated entity) | Broadcast: No Network: No Session ID: No (all optional) | GCS position(s) reported prior to flight, flight timeframe reported prior to flight, flight airspace volume reported prior to flight, BVLOS possible with added RID reqs, Automated possible with added RID reqs |
| Generally Approved | Open FAA- designated public, government and commercial areas | Broadcast: Yes Session ID: No Network: No (Session and Network optional) | VLOS only, encrypted GCS location provided. |
| Controlled | Flight plan and flight pre-approved by UTM. Session ID for flight plan approval transferred to UAS for broadcast and optional network transmission. | Broadcast: Yes Session ID: Yes Network: conditional on Broadcast Receiver/Network service availability in flight path | BVLOS & Automated possible with added RID reqs |

TABLE 3-continued

Performance Based Airspace Classification

| Airspace RID Type Recommendation (Not to be confused with Airspace Classes) | Description | Broadcast/ Network/ Session ID | Possible Regulatory |
|---|---|---|---|
| Restricted | Flight plan and flight pre-approved by UTM. Session ID transferred to UAS for broadcast/network transmission. Near-real-time flight monitored by UTM. | Broadcast: Yes Session ID: Yes Network: Yes | BVLOS & Automated possible with added RID reqs |
| Prohibited | Not allowed | Not allowed | Not allowed |
| BVLOS (addendum) | Beyond Visual Line of Sight flight requires continuous monitoring by UTM. Can be added as an option to other categories with appropriate clearance. | Broadcast: Yes Session ID: Yes Network: Yes continuous Network connectivity and control required | Additional Operator Licensing, UAS equipment certification/ requirements? |
| Automated (addendum) | Pre-programmed flight patterns require continuous monitoring by UTM. Can be added as an option to other categories with appropriate clearance. | Broadcast: Yes Session ID: Yes Network: Yes continuous Network connectivity and control required | Additional Operator Licensing, UAS equipment certification/ requirements? |

(Yes = required, No = not required)

Broadcast Messages on the Network when Available

The FPID system 900 enables broadcast messages to be forwarded to a network 902 for inclusion in the Net-RID Display Provider USS 920 data streams, where possible.

Broadcast messages have some technical limitations and differences from network transmitted messages. Fundamentally, broadcast is a one-way communication while network transmission can be a two-way communication.

Additionally, broadcast communications currently have some limitations with regard to message size. Legacy broadcasting as defined in the standard requires the use of multiple messages to communicate the RID data. However, improved broadcast technology is overcoming these issues, essentially enabling a broadcast message to notionally fulfill the requirements of a network RID message. However, doing so also requires a networked receiver. Notionally, any networked handheld device, or appropriately equipped cellular communications tower receiving a RID broadcast message could perform the role of a network RID receiver, relaying the received broadcast messages to a Net-RID Service Provider.

Forwarding broadcast messages to the network 902 allows broadcast-only UAS to be included in the larger common operating picture (COP). This also allows dual-mode equipped UAS to have redundant capabilities for RID compliance.

License Plate Functionality is Available for Broadcast and Network

The intent of current public policy is that the license plate functionality of RID is available to the general public. However, the FPID system 900 can optionally broaden the requirement for broadcast RID to make license plate functionality ubiquitous. Anyone with an appropriately equipped mobile or handheld device will be able to directly monitor and report non-network equipped UAS 1040 in their immediate area, with or without a cellular data connection.

Additionally, adding broadcast messages, wherever possible, to the Net-RID USS data streams, makes the COP more complete and allows UAS identification in a broader geographic scope.

The presently disclosed IdM FPID system 900, provided as a public digital service utility for RID, including registration, validation, provisioning and verification functions, provides a reliable and secure, nationally scaled RID system.

Example A: FPID Demonstration in Military and Homeland Defense Context

FPID system 900 prototypes were previously executed in preliminary demonstrations with the US Military and government contractors at the Maneuver Fires Integrated Experiment (MFIX). While at MFIX FPID-LB 1010 equipped aircraft set flight distance records in excess of 3 KM distance and 900 M altitude with intermittent signal return. Regular signal return was generated at 2.6 KM distance and 900 M altitude. Signal returns were received both to independent FPID enabled receivers 1020 and smartphones.

The FPID system 900 was integrated into a US Army Stryker, equipped with the Northrop Grumman SCUWR C-UAS system. The SCUWR operators successfully utilized FPID system 900 for positive-ID confirmation of friendly UAS, enabling them to obtain clearance to fire on hostile UAS with SCUWR's electronic warfare capability and SCUWR's 30MM chain gun.

The Flight Portal ID system 900 demonstrated the effectiveness of FPID-LB 1010 and FPID-CORE 910 prototypes at the US Army Futures Command Maneuver Fires Integrated Experiment. Summary of two successfully achieved objectives:

The FPID system 900 prototype hardware performance limitations explored as engineered to the current ASTM F38 Remote ID standard Bluetooth protocol applied in a military relevant non-sterile environment:

Achieved maximum distance intermittent local broadcast communications at 2.6 KM distance, 900 M altitude.

Integrated with C-UAS operators.

The FPID system 900 achieved successful identification of equipped aircraft 1030 when incorporated with Northrop Grumman and Liteye systems 1060.

The FPID system 900 was used by Northrop Grumman C-UAS operators to confirm positive-ID of UAS and obtain clearance to fire on hostile UAS with both electronic attack and kinetic means, via a 30MM chain gun.

Urban environment testing: FPID-LB beacons 1010 and FPID equipped smartphones 1020 were ground tested in dense urban environments with high crowd volumes during a New Year's Eve celebration in downtown Indianapolis, Indiana. In these preliminary ground tests the FPID system 900 did not register any measurable environmental interference, even in crowds of roughly 400 people, most of whom had at least one emitting smart device.

FPID-LB 1010 demonstrated abilities to "peak" around corners and transmit signals down side streets, but it was apparent that the dual Local Broadcast and Network connection would be needed for successful flight in urban canyons.

Example B: Use Case Scenarios

The following scenarios use the RID and airspace classifications described in this disclosure (not in the Conuse document). See Table 1 for RID Capability Types and Table 3 for Dynamic Performance-based Airspace classifications.

Scenario A: Suburban Backyard Recreational Flight with Model Aircraft (Non Equipped RID Capability in FAA Recognized Identification Areas (FRIA) or Exempt Airspace)

In this scenario, a modeler can fly in a UTM assigned FRIA or other exempt airspace without RID. All FAA rules regarding VLOS, distance between Unmanned Aircraft (UA) and Ground Control Station (GCS), etc. apply. Outside FRIA or exempt spaces, RID and flight constraints apply. As an example—a modeler may not be able to fly recreationally if they live in the National Capital Region around Washington D.C., just as they cannot today.

Scenario B: Commercial Agricultural Flight in Rural Environments. (Standard RID Capability in Exempt Airspace)

In this scenario, a commercial seed company is conducting a survey of an experimental seed field. Network connections may be compromised in this environment due to the field's rural nature. However, a beacon 1010 equipped aircraft can continue to fly and broadcast its signal so that smart-device handhelds 1020, like farmer owned tablets or law enforcement smartphones, can obtain local broadcast signals. In addition, ground receivers 1020 that are dispersed around the field environment can also identify the aircraft. RID broadcast is hypothesized to be picked up by smart-devices in aircraft, such as crop dusters.

The beacon 1010 equipped UAS is designed for constant broadcast and can provide RID as a method of Detect and Avoid (DAA) to other beacon 1010 equipped UAS with two-way capabilities, or more advanced UAS with both local broadcast and network capabilities. Because of their higher performance capabilities, it is suggested that UAS equipped for both local broadcast and network capability yield right of way to lesser equipped UAS, such as the broadcast-only equipped UAS.

It is suggested that broadcast-only equipped aircraft also be equipped with redundant DAA technology, such as vision sensors, on-board radar, etc, but further consideration is out of scope of this disclosure and dictated by OEM choice and FAA policy.

Scenario C: University Research Team Flight in Urban Environment (Standard RID Capability in General Approved Airspace)

In this scenario, a university is conducting flight experimentation and research for a new widget flown on a university owned and operated UAS built and configured for test flights over University property. The UAS is equipped with a broadcast beacon. The University provides permission for the flight over allowed areas and can monitor UAS using the broadcast "license plate" associated with any UAS detected. Unapproved or outside and interfering UAS can be reported to University security and local authorities.

Scenario D: University Security and Local Authorities Respond to Unidentified UAS Over University Property (Non Compliant RID Capability in General Approved Airspace)

A student is flying a popular commercial drone to capture video near a crowded, outdoor event on campus. University security are unable to see a broadcast or network "license plate" from the drone using their mobile device display application. Security has the ability to immobilize the drone but deems its behavior to be not an immediate threat so they canvas the area on foot and find the student with GCS within a few hundred feet of the UAS. (The drone is required by the FAA to have firmware installed that limits its use without a Network connection but this equipment was purchased prior to the requirement. The GCS includes the student's mobile device with cellular data connectivity but an internet connection is not being used during flight). The student is required by security to bring the drone down safely. The student is informed of University policies requiring registration for drone flights for approved purposes in conjunction with RID capabilities. The student can update his firmware to bring his system into Limited compliance. The new firmware limits drone flight to no more than 400 feet from the GCS when a network connection is not persistent and also provides network transmission of the drone's RID, GCS location and drone location using the student's existing service plan. Local authorities exercise discretion in regards to federal rules and local ordinances.

Scenario E: University Student Flies Near Crowded On-Campus Event with Permission (Limited RID Capability in General Approved Airspace)

The same student as in the previous scenario upgrades the firmware on his drone. The process requires online registration of the drone and the owner/pilot with the public digital service utility which validates the student's real identification and the drone's provenance with the OEM via valid manufacturer serial numbers (MSN) provided to the OEM from the utility prior to manufacture for the US market. The registration process is integrated into the OEM's firmware update services using the public utility's universal registration/login so that the student accesses a single online service (from his view). The student obtains permission from his University to fly near, but not over, a crowded event on campus in order to obtain video footage of the event. The student's mobile device, integrated into the GCS, periodically transmits the UAS OEM serial number, GCS location and UAS location to a default Net-RID service provider 920 for that region. University security staff and local law enforcement at the event are able to monitor the UA flight and see relevant PII if necessary. University security staff can cross reference the license plate with their approval system.

Scenario F: High School Science Class Flight Over Public School Property (Standard RID Capability in General Approved Airspace)

The high school science class, under the supervision of the science teacher, conducts experiments by dropping items from a robotically controlled mechanism on the UA. The UA flies over an unused athletic field during class time. The school property is in a suburban neighborhood environment. The UA is equipped with a broadcast RID beacon 1010 and no network RID or Session ID is required. Residents of nearby homes on the other side of a fence that separates school property from private property are able to see the "license plate" and some general information about the UA's purpose. Some of the mobile apps 1022 used by neighbors to detect the RID broadcast are capable of translating and forwarding the broadcast messages to a Net-RID Service Provider 920 via the internet 902. Therefore, this UA can be viewed on any network display application with access to this geographic area and authorities 1060 with proper authorization could look up more in-depth ownership and/or piloting information for this UA (information that had been collected upon purchase/registration.)

Scenario G: Commercial Small Business Flight in Mixed Rural and Suburban Environment (Standard RID Capability in General Approved Airspace)

In this scenario, the commercial small business is a land surveying company with a small fleet of ten UAS. On a particular workday, six survey teams are sent out to conduct eight projects. The teams use an internet connected mobile or desktop application 1050 provided by their USS/UTM service 920 to obtain flight session IDs for each project. The teams are accessing their USS/UTM service via the public digital service utility's universal login feature 930 and receive a Session ID that originated with the utility 920. Teams transfer each ID to their respective broadcast-enabled UAS via a near field connection (NFC), Bluetooth or Wireless connection. Each session ID has been encumbered by the UTM service with the appropriate flight authorization/traffic management timeframe and airspace constraints. These flight constraints are critical for the public and local law enforcement to verify the purpose and provenance of the flights (and associated PII if necessary) as they fly near residences and public infrastructure.

Scenario H: Urban Commercial Delivery (Commercial/Advanced RID Capability Across a Combination of General Approved, Controlled and Restricted Airspace with Automated and BVLOS Flight)

In this scenario, a very large package delivery service operates a local fleet of several hundred UAS, each with multiple flights in a 24-hour period, within and nearby an urban area. The corporation has developed a USS/UTM application 1060 that logs in to its USS/UTM service provider 920 via the public utility's universal login 930, 940 and streams flight plan authorization requests to the UTM service provider who obtains Session IDs from the utility, ties them to flight plan and flight plan authorization status and returns them to the delivery service for transfer into the UAs. The UTM service assures that the BVLOS and semi-autonomous flights are monitored and adjusted via constant network 902 connectivity. Ubiquitous broadcast receivers 1020 along the flight paths provide an essential back-up for monitoring flights during any network anomalies or service dead zones crossed by the flight paths.

These operations may see the UAS fleet operate through numerous urban canyons or patches of airspace that drop network service due to obstruction (buildings) or even temporary network saturation. In this event, the UAS are equipped with both broadcast and network capabilities, enabling them to continue maintaining safe and effective operation of RID services in the event of these drops in service. The RID verification system 940 can continue to provide network situational awareness of broadcast equipped aircraft with receivers 1020.

USS/UTM display applications on smart devices 1020 can deliver RID information to the general public, receiving customers, or law enforcement based on the end user's stakeholder status (A police officer 1060 sees more than the general public 1060).

The delivery UA can authenticate (again, using the universal login credentials and service provided by the public digital service utility 920) with a RID-equipped smart mailbox that unlocks for package delivery.

Scenario I: Federal Law Enforcement Drug Trafficking Surveillance Flight Along Rural Southern Border (Commercial/Advanced RID Capability Across Multiple Dynamic Airspace Types).

The USS 920 recognizes this as an approved or authorized aircraft, just as it would any other approved and authorized aircraft. Airspace access, via the federal RID credential, may be waived or merely recognized as "approved" on the UTM side, permitting the UAS to operate unencumbered. Actual aircraft RID is recognizable only by authorized stakeholders, such as federal agencies or local law enforcement partners. The general public sees this aircraft as "approved" with session-ID license plate information, just like they would any other session-ID operating UAS. The agency may choose to self-identify and announce their aircraft as a LE operated aircraft should they wish.

Scenario J: Multiple Stakeholder UA Flight at Sporting Event with Complex Airspace (Commercial/Advanced in Restricted Airspace)

The Indianapolis 500, the largest single-day sporting event in the world, is a tremendously busy airspace with mixed manned and unmanned aircraft, special rules, and significant security considerations. In this environment only specifically credentialed and cleared UA are enabled to enter the airspace around the Indianapolis Motor Speedway. These may include public safety UA, approved film/media production UA, or other approved UA all performing both Local Broadcast and Network communications.

The core IdM FPID system 900 is simultaneously feeding RID data into the Command and Control (C2) and C-UAS tools 1050 used by authorized authorities 1060 so they may conduct the airspace security mission for the Indianapolis 500.

Scenario K: A law enforcement officer (LEO) investigates a suspicious UAS either seen by her own eyes or alerted to her by the general public. The LEO utilizes the approved application 1022 on their phone 1020 to query the airspace and the aircraft in question. The specialized display application queries the IdM FPID RID Verification Service 940 for information about the UAS, which includes information from the UAS registry 942 and other US government data sources 944, which is then returned to the officer. Based on a violation, or not, the officer can make a decision and take action if necessary.

Scenario L: Session ID from Utility as Single Source of Truth for Air Defense.

A SSOT is critical for air defense. In the event of no SSOT, if there's an error and a duplicate ID, multiple ID, or missing ID is in place then an air defense/security authority is likely to engage mitigations. This would result in a negative outcome, such as a "shelter in place" order for the National Capital Region or the unnecessary downing of a UAS and potential collateral damages associated with that action.

Additional Features and Embodiments

The systems and methods of the following additional features and/or embodiments further allows for the establishment of communications protocols in a safe and sensible manner that both protects and shares identity and other informational data at the same time. The below components of or the complete system 200 and associated methods disclosed may be combined with components of or the complete above disclosed FPID system 900.

Figure 2:
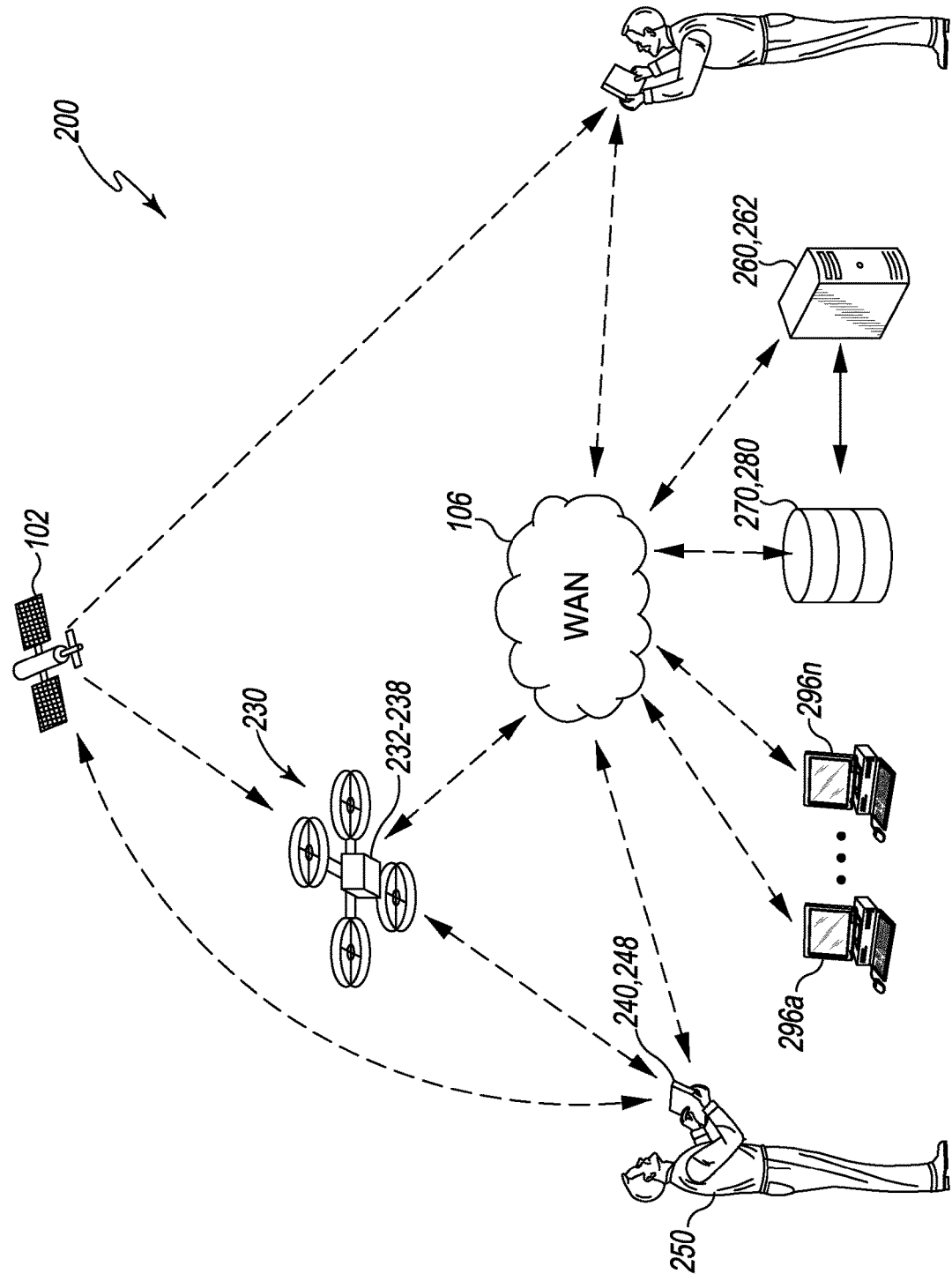
FIG. 2 is an exemplary system for remote identification of unmanned aircraft systems, according to the present disclosure.

Referring to FIG. 2, and illustrative embodiment of an air traffic identity and management system 200 according to the present disclosure is illustrated. The system 200 can be used to identify and manage UAS 230 and piloted aircraft 120a-b, and generally includes one or more processors 260, an application layer 262, a data store layer 270, and a secure layer 280, for example a blockchain layer. Advantageously, system 200 is network based and can use an existing network such as a wide area network (WAN) 106; therefore, rather than depending on and requiring conductivity to a specialized, dedicated communication network, such as dedicated radio network stations 104 (FIG. 1), system 200 components and users only require a connection to WAN 106. For example, other devices or systems 296a-n, including users such as local law enforcement, existing air traffic control system 110, and the public, can access system 200 at processor 260 via WAN 106.

The UAS 230 includes aircraft 231 and optional remote controller 240, used by operator 250 to remotely pilot aircraft 231. For some UAS 230, the aircraft 231 is controlled autonomously, whether onboard the aircraft of using a remote processor, for example, one of devices 296a-n running an instance of control software (not shown). A typical aircraft 231 can including identity module 232 enabling cooperation with system 200, identity module including, for example, one or more of transceiver 234, memory 236, and processor 238 to transmit and receive informational data pertinent to system 200 as further discussed below, including for example, data pertinent to identity and position and velocity, for example as determined from timing signals received from GNSS 102. In at least one embodiment, transceiver 234 is capable of direct communication with WAN 106. In at least another embodiment, communication with WAN 106 is via controller 240. For example, controller 240 can include one or more of identity module 242, transceiver 244, memory 246, and processor 248. The transceiver 244 of controller 240 provides communication with transceiver 234 of aircraft 231, for example, via a secure radio link, and the controller 240 is in communication with WAN 106, for example, via a cellular network connection. As such, informational data associated with system 200 and stored locally in UAS 230 may be stored in memory 236 and/or memory 246 and processing in UAS 230 associated with system 200 in part may be in processor 238 and/or processor 248. For example, access credentials or informational data pertinent to access credentials associated with UAS 230 and/or operator 250 may be stored in memory 236 and/or memory 246 and used to access the application layer 262, data store layer 270, and secure layer 280.

The illustrative air traffic identity and management system 200 may also include passive interrogation device(s) 290. As will be described further below, the passive interrogation device 290 can be any processor, including handheld computing devices such as smartphones and tablets, that provides a position of interest to processor 260 to query. For example, sensor 291 may include a camera, GNSS receiver, and solid state accelerometer that together function with process 292 to determine the geographic position of device 290, a relative position of UAS 230 at which the camera of the device is centered on, and thus a geographic position of device the UAS. The device 290 can then transmit the position of the UAS 230, for example, approximate coordinates and altitude, in a query to processor 260, along with a user credential. As further described below, processor 260 can receive and provide at device 290 a response from processor 260 relating to the UAS 230 and/or operator 250, including for example, informational data pertinent to flight activity authorization, identity, and even the location of operator 250, depending on access policy and the authorization associated with the user and/or device 290.

In one illustrative system 200, UAS 230 and interrogation device 290 may be capable of direct communication, with UAS 230 either broadcasting or responding to an interrogation request from device 290 and send informational data that can be received directly by the interrogation device 290. For example, the direct communication may be via commonly featured wireless connections such as WIFI or BLUETOOTH, or a specific aviation related technology such as ADS-B.

Figure 3:
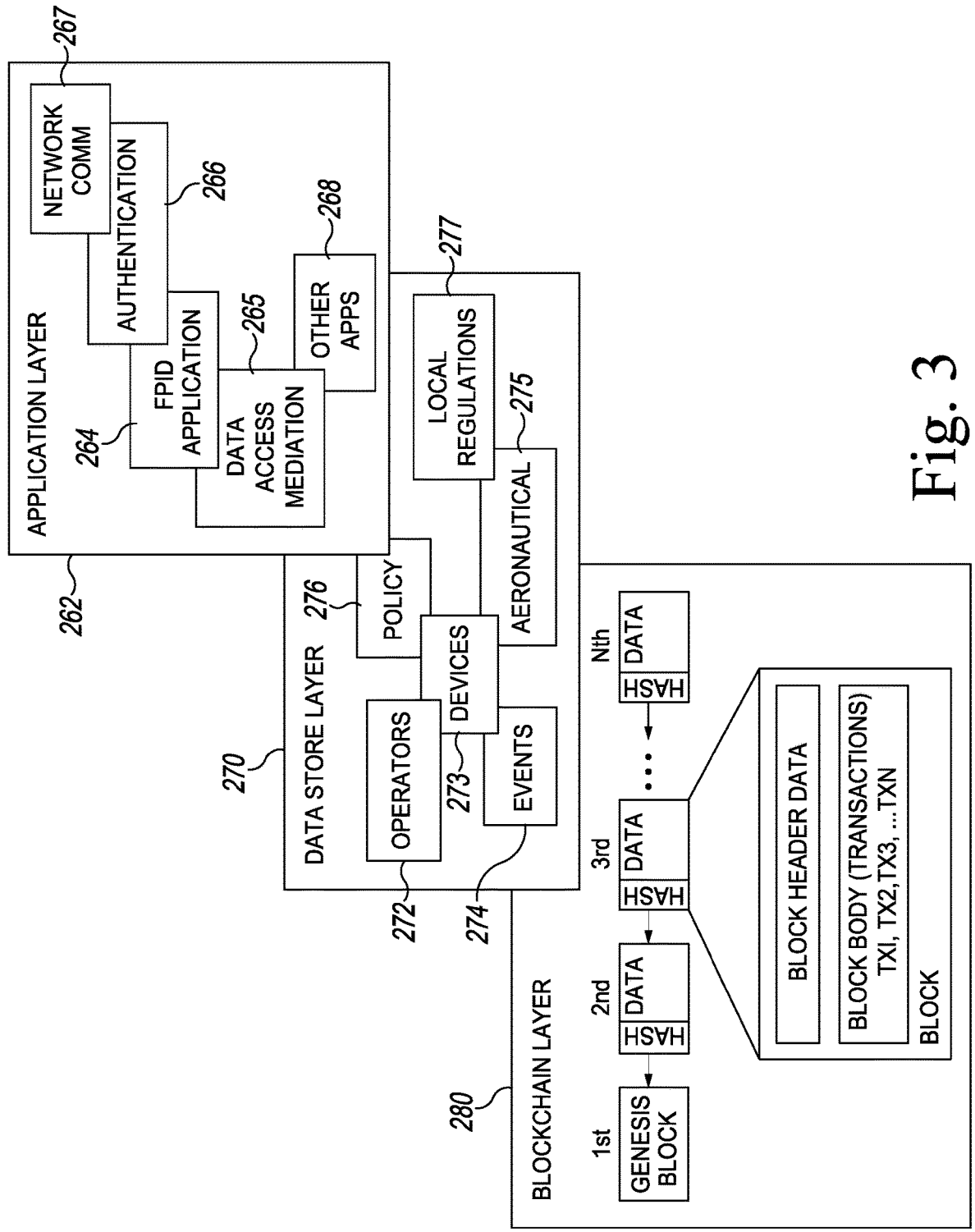
FIG. 3 is a block diagram of an exemplary application and database structure of the system of FIG. 2, according to the present disclosure.

Referring to FIGS. 2 and 3, the processor 260 may be a dedicated backend, distributed, virtual, cloud, or other former of server or other processor known in the art. An application layer 262 may include one or more of an access application 264, data access mediation application 265, authentication application 266, network communication 267, and other applications 268, including, for example, third-party apps that use system 200. The applications 264-268 may be located on a single processor 260, or may be located one or more of various processors, including processors associated with UAS 230, remote controller 240, passive interrogation device 290, and other devices and systems 296a-n. Additional applications pertinent to aspects of system 200 as are known in the art may also be included in the application layer 262.

A data store layer 270 may include informational and other data pertinent to system 200 and its operation, including but not limited to one or more databases or other localized or distributed data storage architecture, including but not limited to the following registries and/or journals (non-limiting terms simply illustrative one or more collections of related informational data). An operator registry 272 can include data pertinent to operators such as remote and non-remote pilots. A device registry 273 can include data pertinent to aircraft or other devices, including for example, UAS 230 and aircraft 120a-b. An event journal 274 can include data pertinent to planned, active, or historical flight or other activity. An aeronautical registry 275 can include data pertinent to airspace, airports, geographic features, and other information pertinent to flight activity, including airspace restrictions and other regulatory information. A policy registry 276 can include informational data relating to user access to application layer 262, data store layer 270, and security layer 280, including for use by data access mediation application 265, relating to flight approval and priority for UAS 130, aircraft 120a-b, and operator 140, and relating to other aspects of interaction with and functional aspects of system 200. A local regulation registry 277 may include data pertinent to a geographic localized area, for example, state, county, city, or other territorial laws, regulations, emergency operational implications and/or conditions that may be separate from and/or more localized than typical airspace operating restrictions. Additional informational data and system data pertinent to aspects of system 200 as are known in the art may also be included in the data store layer 270.

A security layer 280 may include data integrity and security aspects of system 200, for example, application of cryptographically linked data records, for example, blockchain technology, to access and content for system 200, for example, permissions-based blockchain as is discussed further below.

Figure 4:
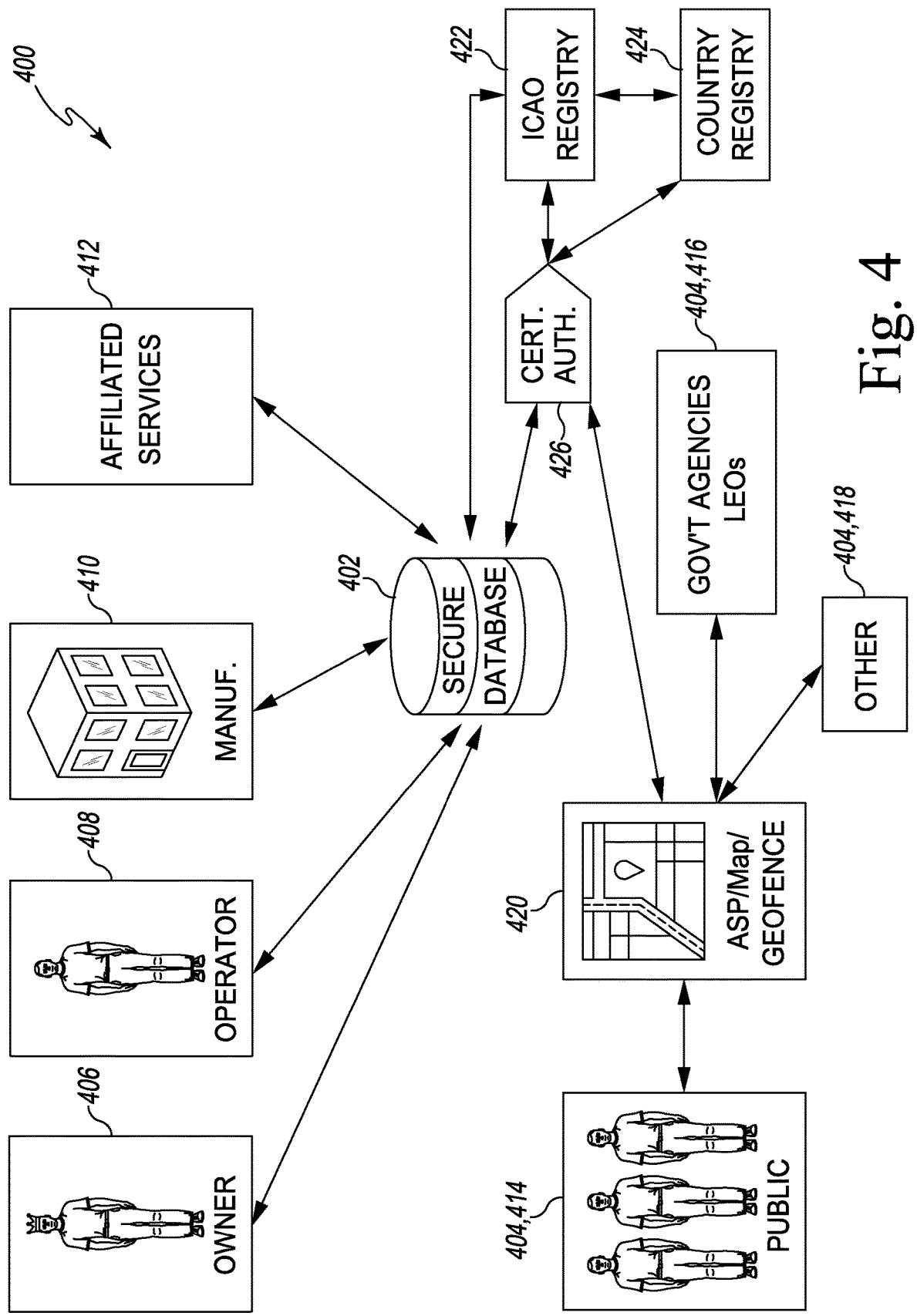
FIG. 4 is a block diagram of an exemplary system ecosystem, according to the present disclosure.

Depicted in FIG. 4 is an exemplary secure database ecosystem 400 implemented by the identity and management system 200, according to embodiments of the present disclosure. The ecosystem 400 collects and shares information, for example, for a manned or unmanned air traffic system, or alternatively, an air traffic identity and management system comprising both manned and unmanned aircraft. At the center of the ecosystem 400 is the multi-layered secure database 402 as described herein for storing and selectively providing access to the ecosystem 400 data.

The secure database 402 acts as a trusted broker of all information provided and collected within the ecosystem 400. Any ecosystem stakeholder (user) 404 may connect to the ecosystem 400, for example, using an Application Programming Interface (API), such as an unmanned traffic management system (UTM), and receive informational data pertaining to and/or provided by a multitude of sources. Such sources can include: aircraft owners 406, aircraft operators 408, aircraft and system manufacturers 410, and affiliated services 412. Informational data pertaining to aircraft owners 406 can include, without limitation, certificates, authorizations, insurance information, regulatory information, point of origin data, and/or affiliated business information. Informational data pertaining to aircraft operators 408 can include, without limitation, training data, operator competency-related data, operating activity logs, and/or operator currency. Additionally, informational data pertaining to aircraft and system manufacturers 410 can include, without limitation, firmware information, aircraft model, aircraft serial number, transceiver information, remote controller information, and/or maintenance records. Affiliated services 412 can include any additional data which may be provided by, for example, employers, insurance, aircraft databases, associations, community organizations, flight logs, certificate authorities, government regulators, manufactures, registries, owners, radars, detectors, other UTM services (e.g., AirMap, Consortiq, Geo.Network, JdxMobile, DJI, etc.), software dashboards, training bodies, and more. All of the source information may be provided to or by an aircraft system through pre-existing peripherals and devices associated with the aircraft, including the aircraft and/or controller themselves, and the telemetry and data from that aircraft.

Other sources of pertinent information may be international regulatory bodies, such as the International Civil Aviation Organization (ICAO) 422, or an individual country's regulatory body 424, such as the Federal Aviation Administration (FAA) in the United States. ICAO, for example, maintains the standards for aircraft registration (e.g., tail numbers), including the alphanumeric codes that identify the country of registration (e.g., aircraft registered in the United States have tail numbers starting with N). ICAO is also responsible for issuing alphanumeric aircraft type codes containing two to four characters. These codes provide the identification that is typically used in flight plans. The FAA, on the other hand, is a United States national authority with powers to regulate all aspects of civil aviation, including the construction and operation of airports, air traffic management, and the certification of personnel and aircraft. A certificate authority 426 may review data provided by an individual country registry 424, or an international body such as ICAO 422, to ensure and establish that the data has met a specific set of requirements before providing it to the secure database 402. With the advent and growth of UAS it is also conceivable that local agencies or regulatory bodies that relate to local privacy, noise, public safety, risk, and other aspects of flight activity effecting local interests will also play a role in regulation, including identifying and managing UAS.

Once the third-party information is collected by the secure database 402, the information is then broadcasted throughout the ecosystem 400, or the identity and management system network, identifying the aircraft's physical location through GNSS, geographic, geofence, or other service or hardware, including radar and radio frequency (RF) technologies, which utilize location based-services.

Stakeholders 404 are any ecosystem 400 user engaging with the ecosystem 400 through an Application Program Interface (API) 420, such as the identity and management system mobile application, a third-party API, or any subsystem or peripheral of the system. Stakeholders may include, but are not limited to, the general public 414, government agencies and law enforcement officers 416, or any other users 418, such as aerospace regulators. The ecosystem 400 APIs 420 interconnect with third-party Geographic Information Systems (GIS), mapping, geofence, and location-based services to share and display an identification of an aircraft and its geographic position across a wide variety of service providers, therefore synchronizing the communication of the aircraft's identity across the network. To accomplish this, the ecosystem 400 is configured to broadcast or otherwise provide the user's identity and additional information to third-party APIs, enabling a user of the ecosystem 400 to communicate their information to all ecosystem stakeholders 404 without regard to which API the stakeholder 404 is using to access the information.

The ecosystem 400 can determine what levels or types of aircraft identity information is shared to a querying stakeholder 404, for example, based on the ecosystem's 400 permission-based blockchain technology. Some stakeholders will only see whether the aircraft is cooperative and approved to fly in the airspace or they may see greater details and personally identifiable information from that aircraft and its operator/pilot. For privacy and security of the aircraft owners 406, operators 408, and manufacturers 410, some stakeholders 404, such as government stakeholders 416, may receive additional and/or more detailed information than what would be provided to a different stakeholder, for example, a general public stakeholder 414. The following are examples of queries from and data points provided to particular stakeholders 404 having varying levels of access credentials.

For a query about an aircraft from the general public 414, the data access mediation application 265 (FIG. 3) may only share data indicating whether the UAS 130 or other aircraft is authorized or unauthorized to be airborne in the particular airspace queried by the user and possibly whether the UAS or other aircraft is known (cooperating) or unknown (non-cooperating) with the system 200. The system 200 can make such an authorization/non-authorization determination by reviewing the data provided from the air traffic regulating bodies participating in the ecosystem 400, for example, if the FAA has initiated a geofence to temporarily restrict air traffic within a particular airspace. The secure database 402 may also share the current geographic position of the aircraft and/or the current geographic position of and/or other information about the aircraft operator, which may be a human or a machine, if the aircraft is unmanned. These geographic positions can be reported in real-time as they will in most circumstances change while the aircraft is in flight, or if not available in real-time due to lack of connectivity with the WAN 106, may be available at a later time as discussed herein.

For a query about an aircraft from a law enforcement agency 416, the data access mediation application 265 may share any information about the aircraft which may be appropriate for law enforcement to receive, such as the identity of the owner, operator, manufacturer, flight authorization status, location of the operator and/or remote controller, and/or its flight history. For example, a law enforcement agency 416 providing protection for an event or location may elect to take counter-UAS or other defensive action if a query using system 200 determines a UAS is unauthorized and/or non-cooperative with the system 200. Similarly, a user affiliated with a regulatory agency 418 may be provided access to the same or a subset of the data provided to law enforcement user 416, as appropriate.

Figure 5:
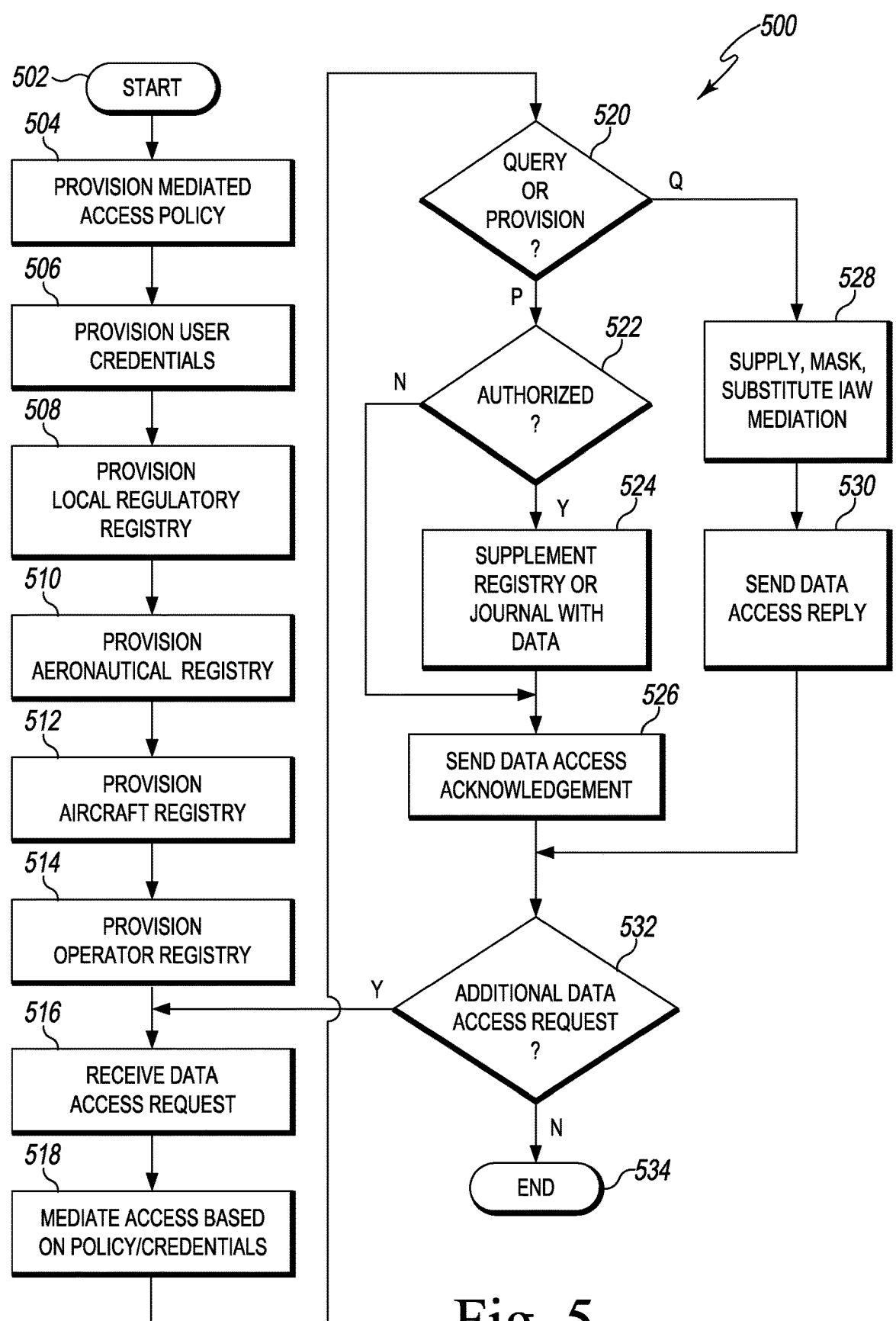
FIG. 5 is a process diagram of an illustrative embodiment of a method of mediating access to information requested by a system user, according to the present disclosure.

Depicted in FIG. 5 is a process diagram of an illustrative embodiment of a method of mediating access to information requested by a user of system 200. The method 500 begins 502 with an administrator of the secure database provisioning a mediated access policy 276 at step 504. Advantageously, the access policy may be a dynamic policy which reacts and responds to real-time situations, such as temporary access credential modifications instituted by law enforcement or regulatory bodies in response to particular events, as well as to policy changes promulgated by legislative, administrative law, or other processes. Next, at step 506, user set up a user credential via an API or other system affiliated user interface with the system 200. These credentials will ultimately be reviewed by the data access mediator of the secure database once a query or other request for access is made within system 200. Next, at steps 508, 510, 512, and 514, a system administrator and/or users provision the local regulatory registry 277, the aeronautical registry 275, the aircraft registry 273, and the operator registry 272, respectively. In additional to relevant airspace and airport information, the aeronautical registry 275 may include a geographic database, or the GIS, mapping, and location-based services, may be provided by third-party services and provisioned to work in affiliate with and overlay data in conjunction with the system 200 and identity and management system ecosystem. The airspace, aircraft, and operator, and optionally the manufacturer registries are each provisioned by inputting each respective portion of data into the secure database. Upon the completion of these steps, which may be performed in any order, the identity and management system ecosystem is prepared to engage with the stakeholders.

At step 516, the application 264 receives a data access request, or query, from a user. Queries may be made through APIs, map based services, third party applications that have API connections to the application and/or data store layers 270 and 280, and IOT devices, including with augmented or artificial reality capabilities. For example, a user can point a mobile device (e.g., a handheld computer device, tablet or mobile phone), such as passive interrogation device 290, at a UAS 230 in the sky to query information about that aircraft. As described herein, and continuing at step 518, the data access mediation application 265 can mediate the access to the information based on the existing access policy and the stakeholder's access credentials. At step 520, the secure database determines whether the access requested is with regard to a data query or a data provision, and the results of that stakeholder's query may thereafter be provided based on the access level of stakeholder. For a data query, at step 528, the application 265 may first review the access credentials and determine whether to supply the data unaltered, or mask or substitute any data to affect the current policy with regard to the access credentials. In some instances, a law enforcement or military aircraft may require anonymity, and in such instance the data provided about the aircraft in response to a query may be restricted or substituted. Once these steps have been completed, at step 530 the data access reply is provided to satisfy the query. In other cases, for example, an inquiry by the general public, the response may simply be whether the UAS or other aircraft flight activity is authorized, unauthorized, or unknown to system 200.

If, at step 520, the secure database instead determines that a provision query has been made, the method continues to step 522 to determine whether such a provision is authorized, for example, an operator 250 updating their currency or other information. If the provision was authorized, such as if the request was received from a user with the appropriate access credentials to provision the database, at step 524, the secure database will accept the provision and supplement the registry or journal with the data provided with the request and send the data access acknowledgment back at step 526.

Once all query and provision requests have been completed, at step 532, the identity and management system will wait for the next data access request from a user. Access requests may be initiated manually by a person, or may be an automated user in response to events, software algorithms, AI, or other machine based functionality. Once a request is made, the process repeats beginning again at step 516, otherwise the process ends 534.

Figure 6:
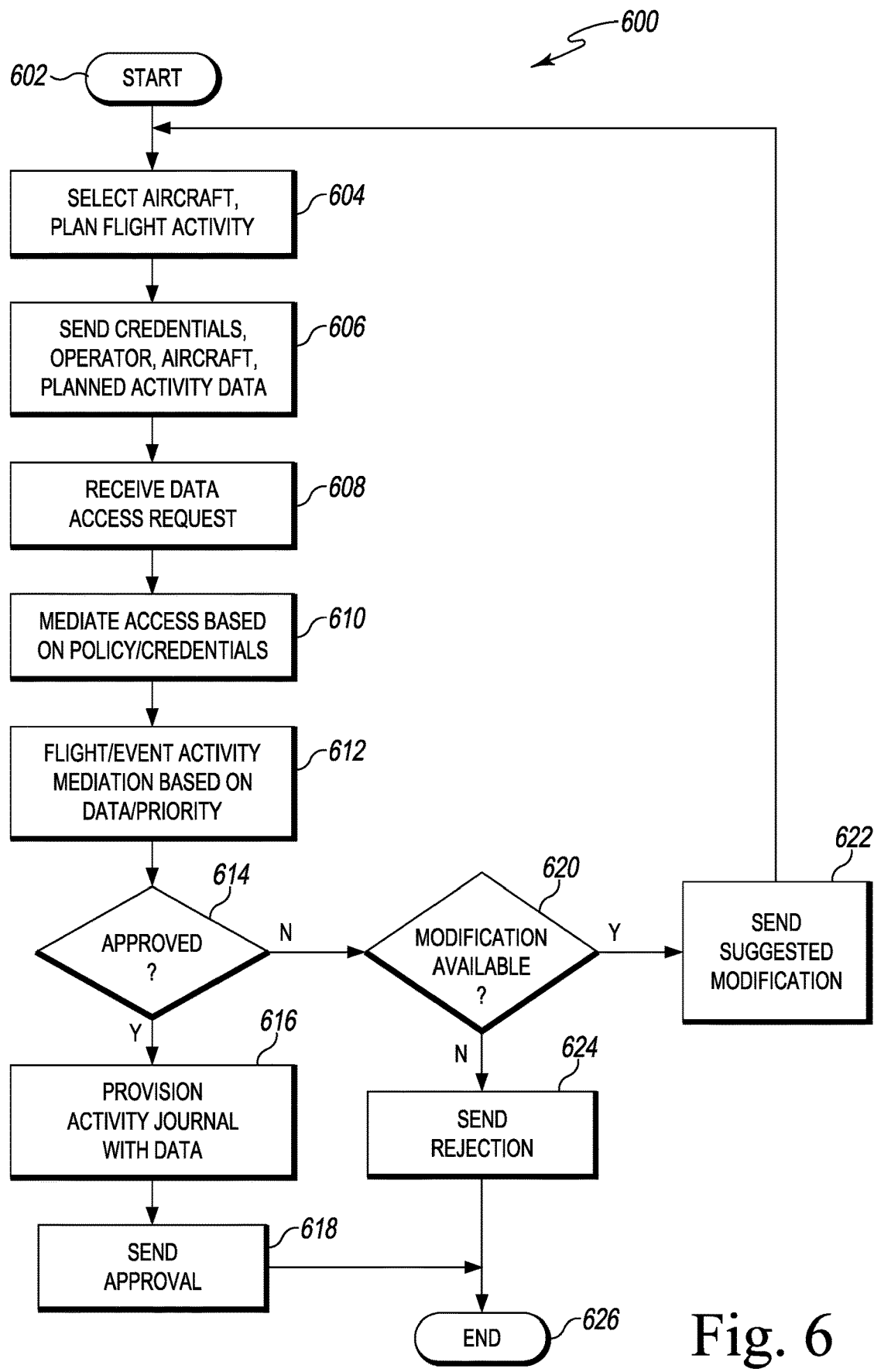
FIG. 6 is a process diagram of an illustrative embodiment of a method of filing a flight plan with the air traffic identity and management systems of the present disclosure.

Depicted in FIG. 6 is a process diagram of an illustrative embodiment of a method 600 for registering a flight plan with the air traffic identity and management system 200 of the present disclosure. The method 600 begins at step 602 and moves to step 604 wherein an aircraft operator/pilot selects an aircraft and planned flight activity. Once this step is complete, at step 606, the operator/pilot then sends, for example via other apps 268, or otherwise causes access to his/her credential, operator information, aircraft information, and planned activity data to the application 264, and the system receives such data at step 608. At step 610, the system, particularly the data access mediation application 265 mediates the operator/pilot's access based upon the operator/pilot's access credentials and the current access policy 276 as described by select portions of process 500. At step 612, the application 264 or other apps 268 will review the flight plan/event activity with regard to the known airspace restrictions, operator qualifications, and other data and/or considerations/policy shared to the air traffic identity and management system 200 which may affect the submitted plan and, at step 614, will determine whether the plan may be approved in accordance with the policies and activities which will be in affect at the time of the planned flight. If the plan is approved, at step 616, the system 200 will provision the activity journal with the planned flight activity and at step 618 send the approval back to the operator/pilot and cease the process at step 626. If the plan is not in condition for approval, at step 620 the system will determine whether a modification is available which would put the plan in condition for approval. If there is no such modification, at step 624, the system will notify the operator/pilot that the planned flight activity has been rejected and the process will cease at step 626. If a plan modification is available, at step 622, the system will send the operator/pilot the suggested modification and/or approve an amended planned activity and return the process back to the beginning at step 604.

Figure 7:
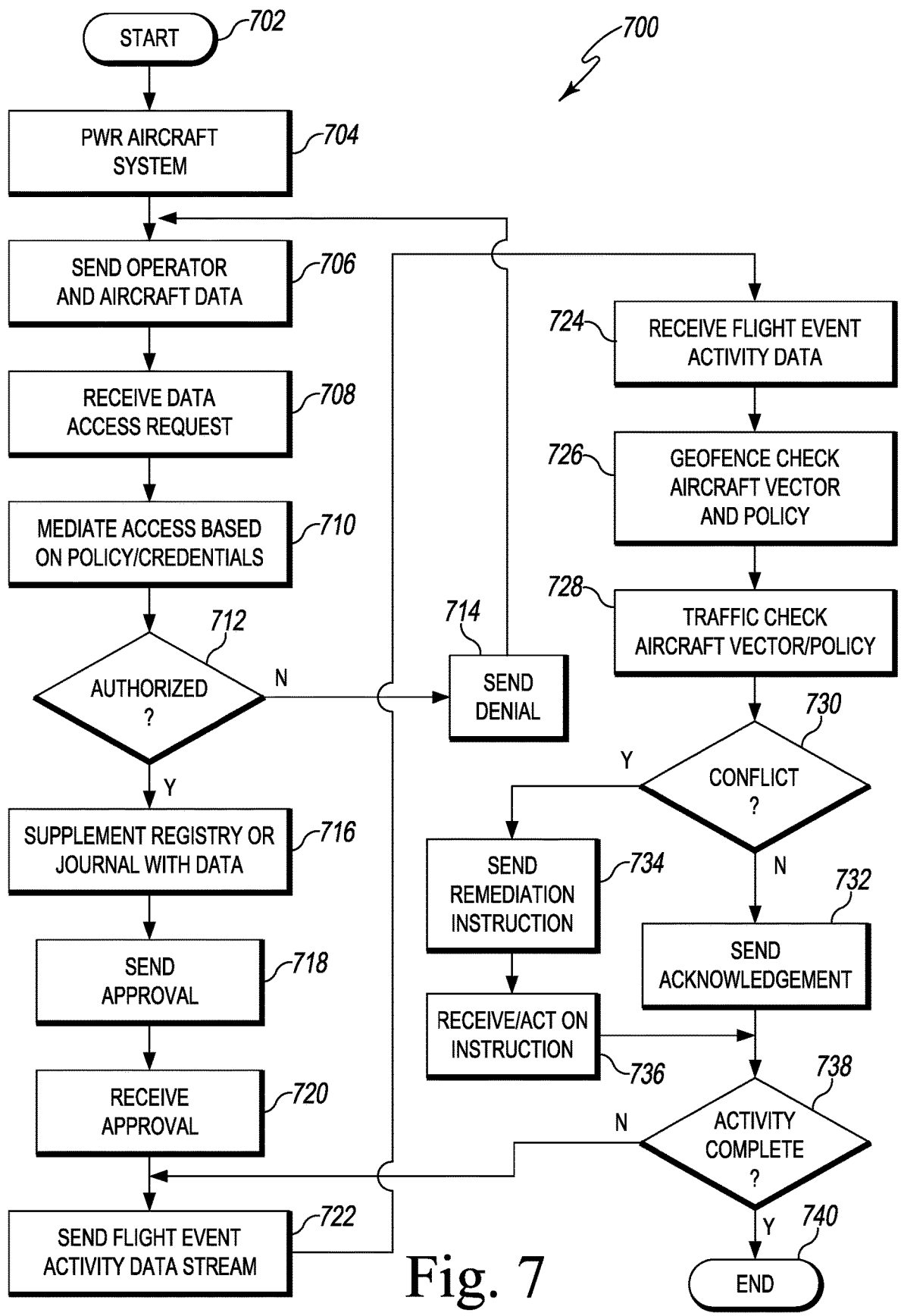
FIG. 7 is a process diagram of an illustrative embodiment of a flight activity including geofencing, according to the present disclosure.

With reference to FIG. 7, the air traffic identity and management system 200 of the present disclosure's use of identity, for example, as a "key" can work with regulators and Unmanned Traffic Management (UTM) Service Providers (USS) to gain access to segregated airspace based upon the key or identity requirements to access this airspace. Some GIS, mapping, and location-based services may have the authority to communicate with the identity and management system 200 to allow or deny the aircraft's entry into a physical airspace based on its information key. Such airspace could be Temporary Flight Restricted (TFR) airspace, VIP airspace, military airspace, airspace around critical infrastructure, or other local or federal airspace and/or flight activity designations within a changing and dynamic air traffic environment. As described by process 700, an area of interest may be geofenced to restrict access to that and be broadcasted to the network. For example, only certain operators or other users with the proper identity and credentials may gain access to this airspace and begin a flight activity within or fly through the geofence boundary.

Depicted in FIG. 7 is a process diagram of an illustrative embodiment of a flight activity including a geofence, according to embodiments of the present disclosure. The process 700 begins at step 702 and proceeds to step 704 wherein the aircraft system is powered up and, at step 706, the operator and aircraft data is sent, for example, by the aircraft 231 or controller 240 of a UAS 230. At step 708, the application 264 or other app 268 receives the data access request. At step 710, the system 200, particularly the data access mediation application 265, mediates the access request based upon the operator/pilot's access credentials and the current access policy as described by select portions of processes 500 and 600. At step 712, the system will determine whether commencement of the flight activity may be approved in accordance with the airspace policies and activities which will be in affect at the time of the flight. If the activity is not approved, at step 714, the system will send the denial and return to step 706 to wait for a new request to be submitted. If the activity is approved, at step 716, the system will supplement the activity journal with data and at step 718 send the approval to the operator/pilot. At step 720, the operator/pilot receives the approval and, at step 722, sends the flight event activity data stream in real-time as the flight is in progress. The system will continually receive, at step 724, the data stream and make determinations about whether the aircraft is operating outside of the authority provided it by the approval. At steps 726 and 728, in no particular order, the system can specifically check the aircraft position and flight data received with regard to the existing geofence boundaries and traffic conditions in the aircraft's airspace. At step 730, the system will analyze the data from steps 726 and 728 and determine whether a geofence boundary or traffic condition has been violated by the aircraft, including relative to a priority assigned to the flight activity in accordance with policy. If there is a conflict, at step 734, the system will send the operator/pilot remediation instructions. At step 736, the operator/pilot will receive those instructions, whether the instructions are provided to a pilot in the cockpit or by an unmanned system operator on the ground. In the case of an unmanned aircraft operator 250, the instructions may be provided to the operator through the unmanned system controller 240 or the operator's connected mobile device. At step 732, if there is alternatively no conflict with geofence boundaries or traffic conditions, the system will send the operator/pilot such acknowledgement and, at step 738, determine whether the activity is complete. If the activity is complete, the process ends at step 740, otherwise the process returns to step 722 wherein the flight activity data steam is again provided and processes accordingly.

Figure 8:
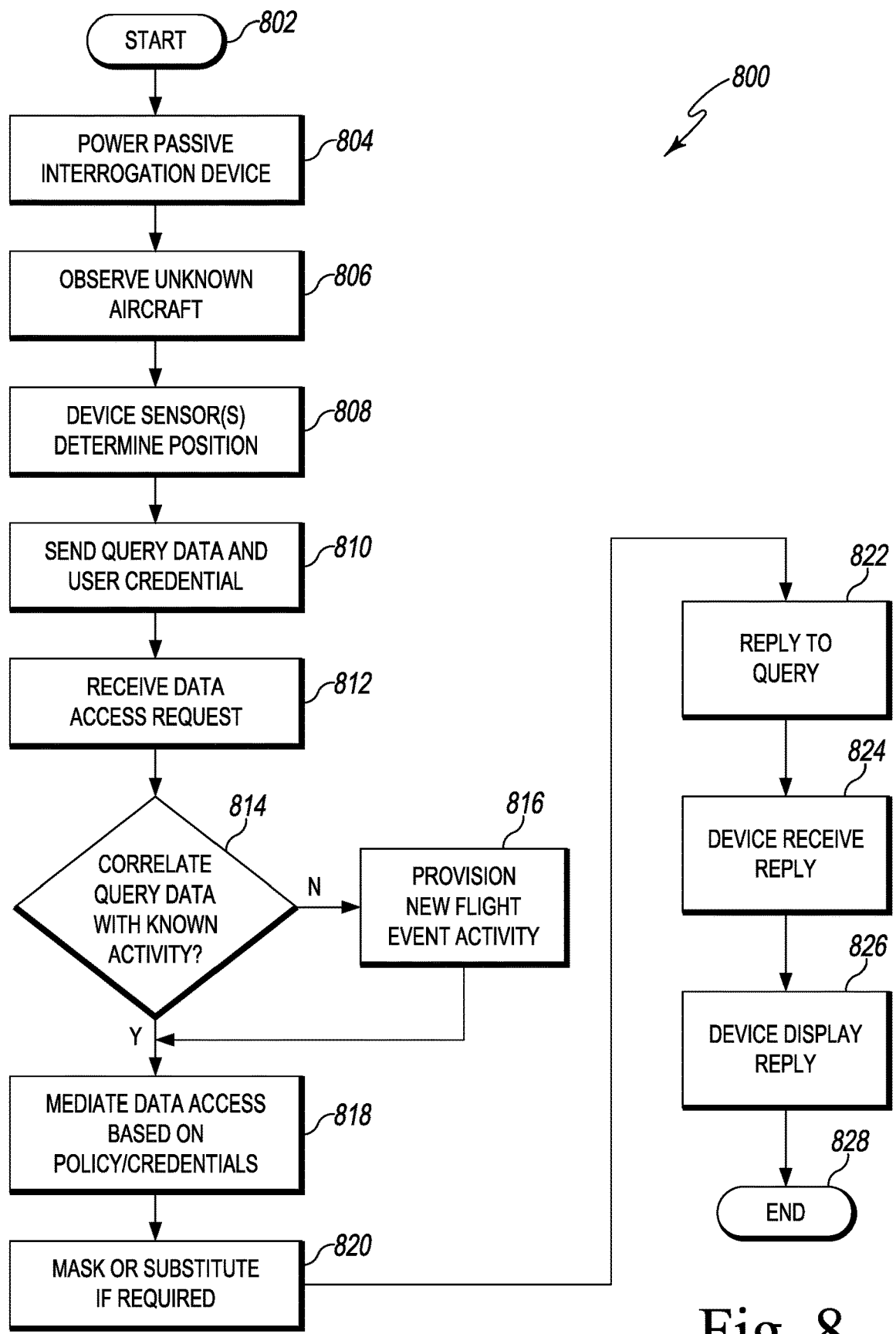
FIG. 8 is a process diagram of an illustrative embodiment of an aircraft identification query, according to embodiments of the present disclosure.
Figure 9:
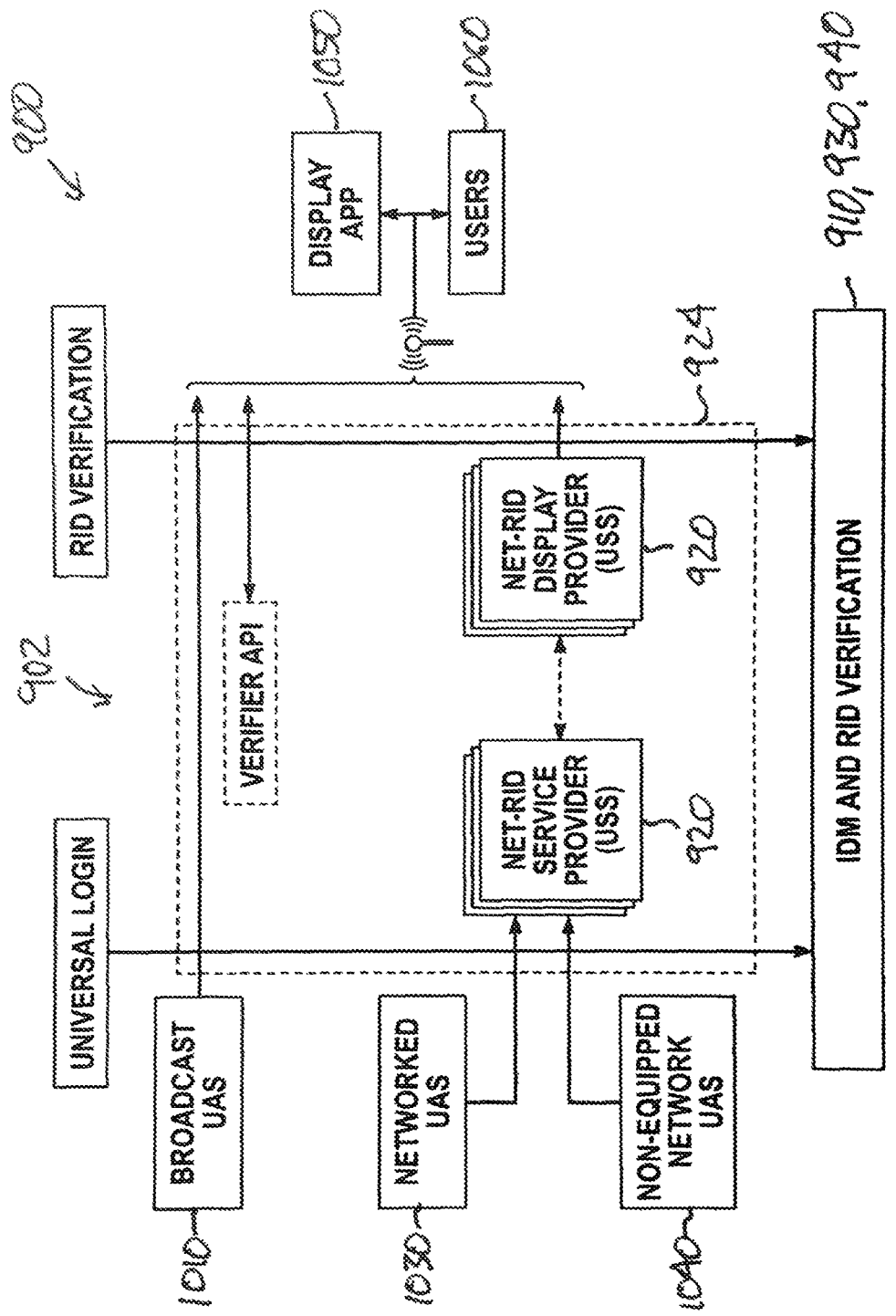
FIG. 9 is a block diagram of FPID and its standards-based interaction with the USS ecosystem according the present disclosure.

With reference to FIG. 8, any user, for example any person in the general public and interested in the identification of a manned or unmanned aircraft 230, can use a device 290 (e.g. a handheld computer device, tablet, or mobile phone) running an API 268 compatible with the air traffic identity and management system 200 of the present disclosure to identify the aircraft when the user points their device at the aircraft. The application 268 can utilize the smart phone's camera to visually identify the aircraft on the screen, and the system may use the geographic location of the device 290 along with the directional orientation the device is facing and triangulation techniques known in the art using the smart phone's movement and relative camera angles to the aircraft 230 to determine an estimated range to develop a geographic position of the aircraft 230 to search. the local airspace for aircraft that are operating based on their electronic broadcast through the identity and management system. More specifically, the mobile device application is configured to utilize both the mobile device orientation and geographic location, along with the geographic location of the aircraft reporting its position within the identity and management system 200, to identify the aircraft that public user is querying. The position of the aircraft system and the position in which the aircraft system is located may be based at least in part on GPS trilateration.

Depicted in FIG. 8 is a process diagram of an illustrative embodiment of an aircraft identification query, according to embodiments of the present disclosure. Although a public user is described herein as the exemplary user of the system embodied by this process 800, it should be understood that any user, such as a government or law enforcement user, or any machine may implement the process 800.

The process 800 begins at step 802. At step 804, wherein the public user powers the passive interrogation device 290. As described herein, the passive interrogation device 290 may include a handheld computer device, tablet, mobile phone, or any other device such as an air traffic control workstation which is capable of interrogating an air traffic identity and management system, optionally without any active communication with the target aircraft 230. At step 806, the user observes the aircraft 230 which the user wishes to retrieve identifying information for. At step 808, the user points the interrogation device 290 toward the aircraft, and the interrogation device using sensors 291 and other possible inputs, including GNSS 102, determine the geographic position of the aircraft 230. At step 810, that information is sent to application 264 to query the aircraft identification data, along with a user credential. The application 264 receives the access request and credential at step 812. At step 814, the identity and management system 200 will correlate the estimated geographic location received from the interrogation device, which can be a combination of the geographic location and the orientation of the device along with estimated range, with the known aircraft data provided to flight activity event journal 274 of the system 200, for example, such as by processes 600 and/or 700. If no data is found from the correlation, at step 816, the system can provision a new flight event activity into the event journal 274. Otherwise, if data is found from the correlation, at step 818, the system will mediate the data access by way of the data access mediation application 265 utilizing the existing access policy in conjunction with the user credentials. Upon making a data access determination for the specific user, at step 820, the system will determine whether the aircraft information should be masked or substituted for any reason, such as if a covert law enforcement or military operation is in progress, and/or if the querying user is only authorized a generalized, substituted response that the flight activity is authorized or unauthorized. Once the system 200 determines which data to provide to the user, at step 822, the system responds to the user and provides the data to the device 290. At step 824, the user receives the data pertaining to the aircraft and, at step 826, the interrogation device can display or otherwise communicate the data to the user. The process then concludes at step 828.

The air traffic identity and management system of the present disclosure could be applied to several types of Internet of Things (IOT) or internet-connected devices which are in need of identifying the authenticated and verified user of the device. More specifically, the air traffic identity and management system can be used as a trusted broker to authenticate and verify the authenticity of users in any type of data sharing ecosystem. This can include user-directed and owned Internet of Things (IOT) devices, unmanned devices, or individuals interacting with financial data systems.

Today's identity-tracking systems are in need of security reform. Identity systems are commonly inefficient, corrupted, or stolen. The repeated defeat of identity will not stand as acceptable in the evolving cyber environment. The air traffic identity and management system described herein, as an advanced and secure permissioned blockchain, can work across the variety of social systems that require authenticated identity.

The user's identity is built by populating the identity and management system with information sourced from the connected services and natively entered and verified data from the user. The combination of this information, regularly updated via the APIs, make up the user's identity and management system.

Sharing of identity is done on a permission basis. The user may opt to share a portion of or the entirety of their identity information with certain types of users, components, and third parties in a UTM ecosystem and elsewhere through the Internet or other connected network. These third parties and other users could be customers of the user, regulators, the public, and other service providers. The underlying basis is that this is a permission based blockchain and that allows the user to share their information with a wide variety of stakeholders, but those stakeholders are only able to gain access to the information that they've been permitted to view and interact with. Access to identity information from these third parties is through identity and management system APIs.

There are at least two methods for tracking aircraft.

Telemetry data packets can be paired with the identity blockchain information—enabling rapid up to date query and tracking of aircraft and devices connected to the identification and management system while also enabling the secure transmission of information contained in the blockchain.

Aircraft/device telemetry data can also be packaged directly into the identity and management system blockchain information. This is done so periodically throughout the operation of the aircraft, enabling the enhanced security and verification of tracking when paired with the more rapid telemetry data packets that are paired, but not directly included into the identity and management system blockchain.

The telemetry data packets notify location based services, including the identity and management system mobile application, that the system user aircraft/device is nearby or requesting access to the airspace or area administered by the location based service provider. While the location based service queries the identity and management system blockchain information to get access to the information that it needs to verify and authenticate the identity of the user and allow access to the aircraft/device.

Security.

As a permissioned based blockchain, the identity and management system is highly secure through the use of hash keys that link blocks together. In one embodiment, all blocks in the chain must authenticate to a previous block in the chain, establishing a secure provenance of information.

Connectivity.

The system's flexibility to build upon its blocks allows for API integration into the chain to build up on and contribute to the information that constitutes the identity of the user. This information, via the third parties, can be wide and vast, but the sealing of it in the blocks for permissioned viewing is highly desirable to the identity and management system and not previously known.

Interoperability.

The identity and management system is designed to be interoperable with a variety of existing and future systems and users—enabling the widespread dissemination and access to the blocks, based on stakeholder permission to view the information within the blocks. The identity and management system's flexibility is designed to allow access from nearly any internet connected device or service that has an approved API for connecting to and querying the identity and management system user identities.

Interaction with Evolving Technologies & Policies

The interoperability allows for it to not just be accessed, but also broadcast across physical and cyber mediums. The information keys can be accessed via broadcast radio, BLUETOOTH, or WIFI, and, pending the correct key is utilized, the third party user with the permission can gain access to the identity information that is broadcast through that transmission.

The identity and management system is designed to handle changes in the types of information that is required to be broadcast or shared from a policy standpoint. The flexibility of APIs to allow third party access assists with this from a technical perspective, but the identity and management system is setup to handle a wide variety of information so it is still functional in the event of policy alterations.

ID Through Permissioned Blockchain:

A blockchain based system can collect disparate information related to the user. The user authorizes the system to act as a trusted broker of their information to share with stakeholders who have permissions to access certain levels of personally identifiable information. The blockchain system according to this disclosure can connect to a variety of information and sources that range from associations, insurance policies, government databases and registries, private databases and registries, as well as the aircraft that the operator is flying.

The APIs that connect to the aircraft pull information from the aircraft into the system, linking it with the personal identifiable information. Such information could include the ground station, the aircraft, GPS location, make/model/firmware versions, and telemetry of the aircraft.

The identity, via the blockchain system, is queryable based on the location of the aircraft, or the IOT connected device. Queries may take place through integrations of internet connected devices or devices that have local network connectivity to the BLUETOOTH and WIFI channels that the aircraft or it's respective remote controller are broadcasting.

The above functionality is built through a series of APIs that can be plugged into third party applications, devices, and hardware that can produce similar to like functionality.

The identity of the aircraft and their users can also be used in conjunction with geofencing services to act as a "key" to gain access to those airspaces. Access to those airspaces is based upon the matching keys of the identity. The geofences and keys are dynamic and capable of altering permission for the IOT device to enter based upon the content of the identity that is represented in the blockchain system.

Blockchain is a transformation in the design of the ledger—it allows multiple parties to share information digitally in a distributed manner that is built upon the trust of previous records, or information blocks, in an efficient manner. It is most commonly understood as the technology that underpins crypto-currencies, but its ability to share information and establish trust is what makes it valuable and what makes it useful for the UAS industry and regulators as a registration and identity system.

A permissioned blockchain allows operators to register their information and allows regulators and operators to determine who can access and view ledger records. In an example flight with 26 record inputs the regulator may need to see information points A, B, and C of a flight's "information block" to identify and authorize the UAS operator, aircraft, and flight. At the same time the public may only be privy to information points A and E (if any) and the operator's client privy to information points C, F, G, and Z. Information points could range from name to location to certifications. In this way, the operator's identity is both shared and protected while simultaneously establishing a trust with the public, client, and regulator. Robust identification based on trust may be the future of UAS operations, but it need not be Orwellian. All users can expand into a new era of interconnectivity with this model. An operator's personal or confidential information isn't compromised and the public is delivered assurance and peace of mind that the aircraft that just flew overhead is authorized to be there and is not engaged in malicious behavior. This distributed permission of information builds trust with the public, ensures authority, and is critical in the forward progression of the industry.

The protection of the operator's information is vital. There are numerous examples of malicious and even violent behavior exhibited by individuals towards UAS operators. Exposing operator identifiable information is unacceptable, could jeopardize the operator or business, and does not follow suite with the practice of manned aircraft in US Class G airspace or even automobile registration and operation. The blockchain can however advise the public that the operation is authorized while granting the regulators the information they need for an operator to fly in a variety of airspaces or across boarders. We do not suggest that every flight need to submit identity to a regulator or public, but we know that it will be required in certain types of operations and airspaces for which the blockchain can be a solution.

Security is addressed through the blockchain's distribution and cryptographic processes for sealing records, preventing their tamper or alteration. No system will ever be perfectly secure, but the crypto-key and record dependent system in a blockchain is robust and helps to fulfill trust and verification through access of records. To break it would require enough computing power and expertise to alter the majority of the system—a difficult task considering the nature of the industry's size. Interfacing with other security protocols, such as SSL, is not impossible and further layers can be introduced should they become necessary. The security of blockchain systems is well recognized and has been implemented by the government of Estonia for many of their information networks as well as NATO, the U.S. Department of Defense, and the European Union.

The transformation of data in this system, like an ID, is instant and flexible. The ledger can be synchronized amongst regulators for ease of information transaction when transitioning airspaces or boarders. Regulators can immediately identify if the operator has the proper documentation they need to prove airworthiness or access to their airspace in a trusted system.

We envision regulators working on the same global blockchain so that all regulators can verify users amongst the industry, distributing identity verification around the globe, bridging trust gaps between states that benefit users, regulators, and operators.

Trust is the necessary factor to gain access to airspace and the blockchain can verify a complete record of flights, permissions, certificates, training, and other information that may be necessary to grant access to airspace.

A fascinating and powerful function of the blockchain is that it does not care if the operator is a human or a computer. It doesn't know the difference between a heart and a processor, but it can facilitate the registration, identification, and system interaction of both human, machine, and the people who may be responsible for the machines. This facilitation is critical for expansion of the industry as manual operations share the skies with automated operations.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

ELEMENT NUMBERING

The below list includes element numbers and at least one word used to describe the member and/or feature represented by the element number. It is understood that none of the embodiments disclosed herein are limited to these descriptions, other words may be used in the description or claims to describe a similar member and/or feature, and these element numbers can be described by other words that would be understood by a person of ordinary skill reading and reviewing this disclosure in its entirety.

100 Prior Art Aircraft Identity and Management System
102 GNSS System
104 Dedicated Radio Network
106 Wide Area Network
110 ATC
120 Manned Aircraft
122 Transponders
130 Unmanned Aircraft System (UAS)
132 UAS Aircraft
134 UAS Transceiver
140 Remote Controller
142 Remote Transceiver
144 UAS Operator
200 Inventive Air Traffic Identity and Management System
230 Aircraft System (Manned or Unmanned)
232 Aircraft Module
234 Aircraft Transceiver
236 Aircraft Memory
238 Aircraft Processor
240 Remote Controller
242 Controller Module
244 Controller Transceiver
246 Controller Memory
248 Controller Processor
250 Operator
260 System Processor
262 Application Layer
264 Application
265 Data Access Mediation Application
266 Authentication Application
267 Comm. w/Network
268 Other Apps (e.g., 3rd Party)
270 Data Store Layer
272 Operator Database
273 Devices/Aircraft Database
274 Events/Activity Database
275 Aeronautical Database
276 Policy Database
277 Local Regulation Database
280 Security Layer/Blockchain Layer
290 Interrogation Device
291 Device Sensor
292 Device Processor
296a-n Other Devices/Systems (ATC, ADS-B, Other Apps)
400 Secure Database Ecosystem
402 Secure Database
404 Stakeholder/User
406 Informational data pertaining to an owner of aircraft systems
408 Informational data pertaining to an operator of aircraft systems
410 Informational data pertaining to an manufacturer of aircraft systems
412 Informational data pertaining to affiliated services of aircraft systems
414 Public Stakeholders/User
416 Government/Law Enforcement Stakeholders/User
418 Other Stakeholders/User
420 Application Program Interface
422 ICAO Registry
424 Country Registry
426 Certificate Authority
900 FPID System
902 RID Network
910 FPID Core subsystem
920 USS
924 API Gateway
930 Registration and Login Gateway
940 Verification Service Gateway
942 FAA Registry Database
944 Other Gov't Data/Database Services
1010 RID beacon
1012 RID firmware
1020 RID receiver
1022 RID software
1030 Networked UAS
1040 Non-networked equipped UAS
1050 User access/display software
1060 Users/User Systems

What is claimed is:

1. A dual-mode system for accessing at least one of government and third-party data systems to identify unmanned aircraft systems, comprising:

a remote identification network;

a remote identity management server configured to access at least one of government data systems and third-party data systems, and further configured to securely affiliate session IDs with at least one of an identity information and flight authorization information of the unmanned aircraft systems, including using the access to the at least one of the government data systems and the third-party data systems to provide flight telemetry data to the at least one of the government data systems and the third-party data systems and to obtain the at least one of the identity information and the flight authorization information of the unmanned aircraft systems from the at least one of the government data systems and the third-party data systems;

a remote identification service provider connected to the remote identity management server via the remote identification network, the remote identification service provider communicating with the remote identity management server to provide authentication of credential information;

a first transmitter associated with a first one of the unmanned aircraft systems, the first transmitter broadcasting at least one of session ID and flight telemetry data of the first one of the unmanned aircraft systems;

a second transmitter associated with a second one of the unmanned aircraft systems and in data communication with the remote identification network, the second transmitter transmitting at least one of session ID and flight telemetry data of the second one of the unmanned aircraft systems to the remote identification service provider;

a first hardware device including at least a first processor, a first receiver, and a first display, the first hardware device configured to receive directly from the first transmitter and display the at least one of session ID and flight telemetry of the first one of the unmanned aircraft systems; and a second hardware device including at least a second processor and a second receiver, the second hardware device configured to receive directly from the first transmitter the at least one of session ID and flight telemetry of the first one of the unmanned aircraft systems, and configured to communicate with the remote identification network, the second hardware device configured to store credential information for the second hardware device and transmit the stored credential information and the at least one of session ID and flight telemetry data to the remote identification service provider for the first one of the unmanned aircraft systems, and upon authentication of the transmitted credential information to receive from the remote identification service provider at least one of identity information and flight authorization information for the first one and the second one of the unmanned aircraft systems.

2. A dual-mode system for accessing at least one of a government and third-party data systems to identify a plurality of unmanned aircraft systems and operable with a wide area network, comprising:
a remote identity management server in data communication with the wide area network and configured to access at least one of a government data system and a third-party data system, including using the access to provide flight data to the at least one of the government data system and the third-party data system and to obtain at least one of identification information, flight authorization information, and flight plan information for the plurality of unmanned aircraft systems from the at least one of the government data system and the third-party data system;
a first hardware device including at least one receiver and wherein the first hardware device is:
configured to receive directly from a first subset of the plurality of unmanned aircraft systems at least one of identification data and flight data for each of the first subset of the plurality of unmanned aircraft systems;
in data communication with the wide area network;
configured to receive via the wide area network from a second subset of the plurality of unmanned aircraft systems at least one of identification data and flight data for each of the second subset of the plurality of unmanned aircraft systems;
configured to store credential information for the first hardware device and to transmit the credential information and the at least one of identification data and flight data to the remote identity management server for each of the first subset of the plurality of unmanned aircraft systems; and
configured to receive in response from the remote identity management server additional data about the plurality of unmanned aircraft systems including the at least one of identification information, flight authorization information, and flight plan information; and
wherein the remote identity management server is further configured to mediate the additional data transmitted to the first hardware device based at least in part on the credential information and access granted under a policy.

3. The dual-mode system of claim 2, wherein the additional data pertains to at least one of an operator of at least one of the plurality of unmanned aircraft systems, an owner of the at least one of the plurality of unmanned aircraft systems, and flight activity of the at least one of the plurality of unmanned aircraft systems.

4. The dual-mode system of claim 2, wherein mediating the additional data includes masking and substituting select data of the additional data based at least in part on mediated access granted to the first hardware device by the credential information under the policy.

5. The dual-mode system of claim 4, wherein the substituting select data includes the flight authorization information selected from a group consisting of authorized, unauthorized, and unknown.

6. The dual-mode system of claim 2, wherein the first subset of the plurality of unmanned aircraft systems transmits at least one of identification data and flight data via at least one of a transmitter and a transceiver.

7. The dual-mode system of claim 2, wherein the second subset of the plurality of unmanned aircraft systems transmits at least one of identification data and flight data via a transceiver in data communication with the wide-area-network.

8. The dual-mode system of claim 2, further comprising:
at least a second hardware device including at least one receiver, and wherein the second hardware device is:
configured to receive directly from a second subset of the plurality of unmanned aircraft systems at least one of a second identification data and a second flight data;
in data communication with the wide area network; and
configured to store a second credential information for the second hardware device and to transmit the second credential information and the at least one of the second identification data and the second flight data to the remote identity management server for the second subset of the plurality of unmanned aircraft systems.

9. The dual-mode system of claim 8, wherein: the at least second hardware device includes at least one transmitter, and wherein the second hardware device is:
configured to transmit an interrogation request a third subset of the plurality of unmanned aircraft systems;
configured to receive from the third subset of the plurality of unmanned aircraft systems at least one of identification data and flight data; and
configured to transmit the credential information and the at least one of the second identification data and the second flight data to the remote identity management server for the third subset of the plurality of unmanned aircraft systems.

10. The dual-mode system of claim 2, wherein the first hardware device includes a display and the first hardware device is: at least one of a passive and an active interrogation device; and is configured to display at least a portion of the additional data about the plurality of unmanned aircraft systems.

11. The dual-mode system of claim 2, wherein the first hardware device includes a handheld mobile device.

12. The dual-mode system of claim 2, wherein the first hardware device is configured to encrypt and relay the at least one of identification data and flight data for each of the first subset of the plurality of unmanned aircraft systems.

13. The dual-mode system of claim 2, wherein the identification information transmitted by the remote identity management server to the first hardware device can include personally identifiable information under the access granted to the credential information under the policy.

14. The dual-mode system of claim 2, wherein the remote identity management server provides validation of the additional data.

15. The dual-mode system of claim 2, wherein the additional data further includes real time and historical flight data about the plurality of unmanned aircraft systems.

16. The dual-mode system of claim 2, wherein: at least one of the remote identity management server and the at least one of the government data system and the third-party data system assigns a session ID to each of the plurality of unmanned aircraft systems; and at least one of the additional data and the identification information includes the session ID.

17. The dual-mode system of claim 2, wherein the first hardware device is in direct data communication with a counter-unmanned aerial system and is configured to provide validation information for each of the plurality of unmanned aircraft systems that is determinative of whether each is authorized or unauthorized.

18. The dual-mode system of claim 2, wherein the first hardware device includes an air traffic control terminal.

19. The dual-mode system of claim 2, wherein first hardware device is carried by an aircraft.

20. A dual-mode system for accessing at least one of a government and third-party data systems to identify unmanned aircraft systems and operable with a wide area network, comprising:
- a remote identity management server in data communication with the wide area network and adapted to access at least one of government data systems and third-party data systems, including using the access to provide flight data to the at least one of the government data systems and the third-party data systems and to obtain at least one of an identification information, flight authorization information, and flight plan information for the unmanned aircraft systems from the at least one of the government data systems and the third-party data systems;
- a first radio associated with a first one of the unmanned aircraft systems, the first radio transmitting at least one of identification data and flight data of the first one of the unmanned aircraft systems;
- a second radio associated with a second one of the unmanned aircraft systems and in data communication with the wide area network, the second radio transmitting at least one of identification data and flight data of the second one of the unmanned aircraft systems to at least one of the remote identify management server and the at least of the government data systems and the third-party data systems;
- a first hardware device including at least one receiver capable of receiving directly from the first radio the at least one of identification data and flight data, the first hardware device also in data communication with the wide area network, the first hardware device configured to store credential information for the first hardware device and to transmit the credential information and the at least one of identification data and flight data to the remote identity management server for the first one of the unmanned aircraft systems, and upon the first hardware device presenting the credential information to the remote identity management server, the first hardware device configured to receive from the remote identity management server at least one of additional identity information, flight authorization information and flight plan information for both the first one of the unmanned aircraft systems and the second one of the unmanned aircraft systems; and
- at least a second hardware device including at least one receiver capable of receiving directly from the first radio the at least one of identification data and flight data, the second hardware device also in data communication with the wide area network, the second hardware device configured to store credential information for the second hardware device and to transmit the credential information and the at least one of identification data and flight data to the remote identity management server for the first one of the unmanned aircraft systems.

* * * * *